US011336560B2

(12) United States Patent
Gast et al.

(10) Patent No.: US 11,336,560 B2
(45) Date of Patent: *May 17, 2022

(54) GATEWAY USING MULTICAST TO UNICAST CONVERSION

(71) Applicant: Extreme Networks, Inc., San Jose, CA (US)

(72) Inventors: Matthew Stuart Gast, San Francisco, CA (US); Liang Wang, San Jose, CA (US)

(73) Assignee: Extreme Networks, Inc., San Jose, CA (US)

( * ) Notice: Subject to any disclaimer, the term of this patent is extended or adjusted under 35 U.S.C. 154(b) by 15 days.

This patent is subject to a terminal disclaimer.

(21) Appl. No.: 16/513,654

(22) Filed: Jul. 16, 2019

(65) Prior Publication Data

US 2020/0044958 A1    Feb. 6, 2020

Related U.S. Application Data

(63) Continuation of application No. 15/673,216, filed on Aug. 9, 2017, now Pat. No. 10,355,977, which is a (Continued)

(51) Int. Cl.
*H04L 12/761* (2013.01)
*H04L 45/16* (2022.01)
*H04L 12/18* (2006.01)

(52) U.S. Cl.
CPC .......... *H04L 45/16* (2013.01); *H04L 12/1886* (2013.01)

(58) Field of Classification Search
CPC ............. H04L 12/1886; H04L 12/4641; H04L 12/1836; H04L 45/16; H04L 45/20; H04L 45/54
(Continued)

(56) References Cited

U.S. PATENT DOCUMENTS 5,845,091 A    12/1998    Dunne
6,006,018 A    12/1999    Burnett
(Continued)

FOREIGN PATENT DOCUMENTS

CN         102055769        5/2011

OTHER PUBLICATIONS

International Application No. PCT/US2013/057692, International Search Report and Written Opinion dated May 1, 2014.
(Continued)

*Primary Examiner* — Tu T Nguyen
(74) *Attorney, Agent, or Firm* — Sterne, Kessler, Goldstein & Fox P.L.L.C.

(57) ABSTRACT

A multicast frame directed to a plurality of devices coupled to a network can be received, where the plurality of devices comprising at least one intended recipient device and at least one unintended recipient device. A destination unicast address corresponding to an intended recipient device can be identified. The multicast frame can be converted into a unicast frame directed to the intended recipient device, the unicast frame configured with the destination unicast address. The unicast frame can be blocked from accessing the unintended recipient device. The unicast frame can be provided to the intended recipient device.

20 Claims, 16 Drawing Sheets

Related U.S. Application Data continuation of application No. 14/216,566, filed on Mar. 17, 2014, now Pat. No. 9,769,056.

(60) Provisional application No. 61/801,516, filed on Mar. 15, 2013.

(58) Field of Classification Search
USPC ........................................................ 709/238
See application file for complete search history.

(56) References Cited

U.S. PATENT DOCUMENTS

| | | |
|---|---|---|
| 6,243,581 B1 | 6/2001 | Jawanda |
| 6,243,758 B1 | 6/2001 | Okanoue |
| 6,751,677 B1 | 6/2004 | Ilnicki |
| 6,847,609 B1 | 1/2005 | Sarnikowski |
| 6,976,087 B1 | 12/2005 | Westfall |
| 7,032,022 B1 | 4/2006 | Shanumgam |
| 7,370,351 B1 | 5/2008 | Ramachandran |
| 7,506,054 B1 | 3/2009 | Fuh |
| 7,774,828 B2 | 8/2010 | Benenati |
| 7,974,234 B2 | 7/2011 | Gustave |
| 8,064,583 B1 | 11/2011 | Sutaria |
| 8,151,323 B2 | 4/2012 | Harris |
| 8,428,601 B2 | 4/2013 | Samar |
| 8,745,716 B2 | 6/2014 | Brudnicki |
| 9,311,462 B1 | 4/2016 | Brown |
| 2001/0044309 A1 | 11/2001 | Bar |
| 2002/0069117 A1 | 6/2002 | Carothers |
| 2002/0099666 A1 | 7/2002 | Dryer |
| 2002/0116463 A1 | 8/2002 | Hart |
| 2002/0138632 A1 | 9/2002 | Bade |
| 2002/0144111 A1 | 10/2002 | Aull |
| 2003/0055818 A1 | 3/2003 | Faybishenko |
| 2003/0061388 A1 | 3/2003 | Cleghorn |
| 2003/0220116 A1 | 11/2003 | Sagefalk |
| 2004/0093340 A1 | 5/2004 | Edmondson |
| 2004/0100983 A1 | 5/2004 | Suzuki |
| 2004/0166874 A1 | 8/2004 | Asokan |
| 2004/0196858 A1 | 10/2004 | Tsai |
| 2005/0010692 A1 | 1/2005 | Jain |
| 2005/0022006 A1 | 1/2005 | Bass |
| 2005/0066200 A1 | 3/2005 | Bahl |
| 2005/0138204 A1 | 6/2005 | Iyer |
| 2005/0141465 A1 | 6/2005 | Kato |
| 2006/0037071 A1 | 2/2006 | Rao |
| 2006/0075472 A1 | 4/2006 | Sanda |
| 2007/0156670 A1 | 7/2007 | Lim |
| 2007/0208744 A1 | 9/2007 | Krishnaprasad |
| 2007/0223490 A1 | 9/2007 | Mizutani |
| 2008/0034401 A1 | 2/2008 | Wang |
| 2008/0098212 A1 | 4/2008 | Helms |
| 2008/0186896 A1 | 8/2008 | Fanfelle |
| 2008/0307523 A1 | 12/2008 | Subramanyam |
| 2008/0316104 A1 | 12/2008 | Seong |
| 2009/0058653 A1 | 3/2009 | Geissler |
| 2009/0103534 A1* | 4/2009 | Malledant ........... H04L 12/1868 370/390 |
| 2009/0172789 A1 | 7/2009 | Band |
| 2009/0228969 A1 | 9/2009 | Garg |
| 2009/0328178 A1 | 12/2009 | McDaniel |
| 2010/0024008 A1 | 1/2010 | Hopen |
| 2010/0042735 A1 | 2/2010 | Blinn |
| 2010/0074418 A1 | 3/2010 | Poremba |
| 2010/0250735 A1 | 9/2010 | Andersen |
| 2010/0277309 A1 | 11/2010 | Anderson |
| 2011/0093434 A1 | 4/2011 | Arora |
| 2011/0093919 A1 | 4/2011 | Naslund |
| 2011/0235635 A1 | 9/2011 | Yadav |
| 2011/0283104 A1 | 11/2011 | Sangubhatla |
| 2012/0155462 A1* | 6/2012 | Arroyo ............... G06F 9/45558 370/390 |
| 2012/0198064 A1 | 8/2012 | Boutros |
| 2012/0226814 A1 | 9/2012 | Stucker |
| 2012/0264402 A1 | 10/2012 | Zhang |
| 2013/0007239 A1 | 1/2013 | Agarwal |
| 2013/0136123 A1 | 5/2013 | Ge |
| 2013/0185446 A1 | 7/2013 | Zeng |
| 2013/0225199 A1 | 8/2013 | Shaw |
| 2014/0095525 A1 | 4/2014 | Hsiao |
| 2014/0098713 A1* | 4/2014 | Beckhardt ............... H04L 45/16 370/256 |
| 2014/0127992 A1 | 5/2014 | Kuscher |
| 2015/0126213 A1 | 5/2015 | Fayssal |
| 2015/0341765 A1 | 11/2015 | Macias |
| 2016/0014025 A1 | 1/2016 | Wang |
| 2016/0183037 A1 | 6/2016 | Grohman |

OTHER PUBLICATIONS

European Patent Application No. 13832735.8, Search Report dated Aug. 1, 2016.

European Patent Application No. 17151065.4, Search Report dated Mar. 7, 2017.

Bolla, R. et al., "A Distributed Routing and Access Control Scheme for ATM Networks," IEEE International Conference on Communications, vol. 1, pp. 44-50, May 1994.

Chen, Qiong et al., "A Cross-Authentication Model for Heterogeneous Domains in Active Networks," IFIP International Conference on Network and Parallel Computing Workshops, pp. 140-143, Sep. 18, 2007.

Deng, Yueming et al., "Trust-Based Fast Inter-Domain Secure Handoff over Heterogeneous Wireless Networks," 7th International Conference on Wireless Communications, Networking and Mobile Computing (WiCOM), pp. 1-5, Oct. 2011.

Long, M. et al., "Localised Authentication for Inter-Network Roaming Across Wireless LANs," IEE Proceedings—Communications, vol. 151, No. 5, pp. 496-500, Oct. 24, 2004.

Seggelmann, R. et al., "Transport Layer Security (TLS) and Datagram Transport Layer Security (DTLS) Heartbeat Extension," Request for Comments (RFC) 6520, ISSN 2070-1721, Feb. 2012.

Wan, Changsheng et al., "A Message Source Authentication Scheme for Inter-Domain Routing Protocols," 6th International Conference on Networked Computing, pp. 1-4, May 11, 2010.

Winter, S. et al., "Transport Layer Security (TLS) Encryption for RADIUS," Request for Comments (RFC) 6614, ISSN 2070-1721, May 2012.

* cited by examiner

GATEWAY USING MULTICAST TO UNICAST CONVERSION

CROSS-REFERENCE TO RELATED APPLICATIONS

This application is a continuation of U.S. patent application Ser. No. 15/673,216 filed Aug. 9, 2017, now U.S. Pat. No. 10,355,977, which is a continuation of U.S. patent application Ser. No. 14/216,566 filed Mar. 17, 2014, now U.S. Pat. No. 9,769,056, which claims priority to U.S. Provisional Patent Application Ser. No. 61/801,516 filed Mar. 15, 2013, which are incorporated by reference herein.

BACKGROUND

Entities, from large organizations to individuals, have implemented computer networks at varying sizes and levels of security. Typically, computer networks have allowed entities to connect digital devices and to allow digital devices to share images, files, video, streaming content, and other data with one another.

Many computer networks have transitioned from using platform-specific protocols toward using general network-addressing protocols, such as Transmission Control Protocol/Internet Protocol (TCP/IP). Under general network-addressing protocols, devices are assigned unique network addresses used to identify their locations on the network. The location can in turn be used to identify the device as a source or destination of network traffic, and can be appended to a portion of traffic to and from the device. In various systems, the unique network address of a device is typically either statically or dynamically assigned to the device.

Devices coupled to a network including more general protocols usually communicate to one another by broadcasting messages to all devices on a network, multicasting messages to a plurality of devices on the network, or unicasting messages to a single device on the network. It would be desirable to efficiently manage such communications.

SUMMARY

In various implementations, there is provided systems and methods to manage multicasts on networks, particularly for devices that communicate only through multicasts. A multicast frame directed to a plurality of devices coupled to a network can be received, where the plurality of devices comprising at least one intended recipient device and at least one unintended recipient device. A destination unicast address corresponding to an intended recipient device can be identified. The multicast frame can be converted into a unicast frame directed to the intended recipient device, the unicast frame configured with the destination unicast address. The unicast frame can be blocked from accessing the unintended recipient device. The unicast frame can be provided to the intended recipient device.

Various implementations provide for incorporation of the systems and methods into a user space of a kernel of a network access device and/or incorporation with multicast Domain Name Server (mDNS) protocols. Various implementations allow the intended recipient device to be taken from one or more of: a plurality of devices associated with a particular network user, plurality of devices associated with a user profile associated with a plurality of network users, plurality of devices associated with a particular network private pre-shared key (PPSK), and a plurality of devices associated with a particular virtual local area network (VLAN). In some implementations, the system is configured to convert all multicasts to the intended recipient device into unicasts to the intended recipient device.

DETAILED DESCRIPTION

Figure 1:
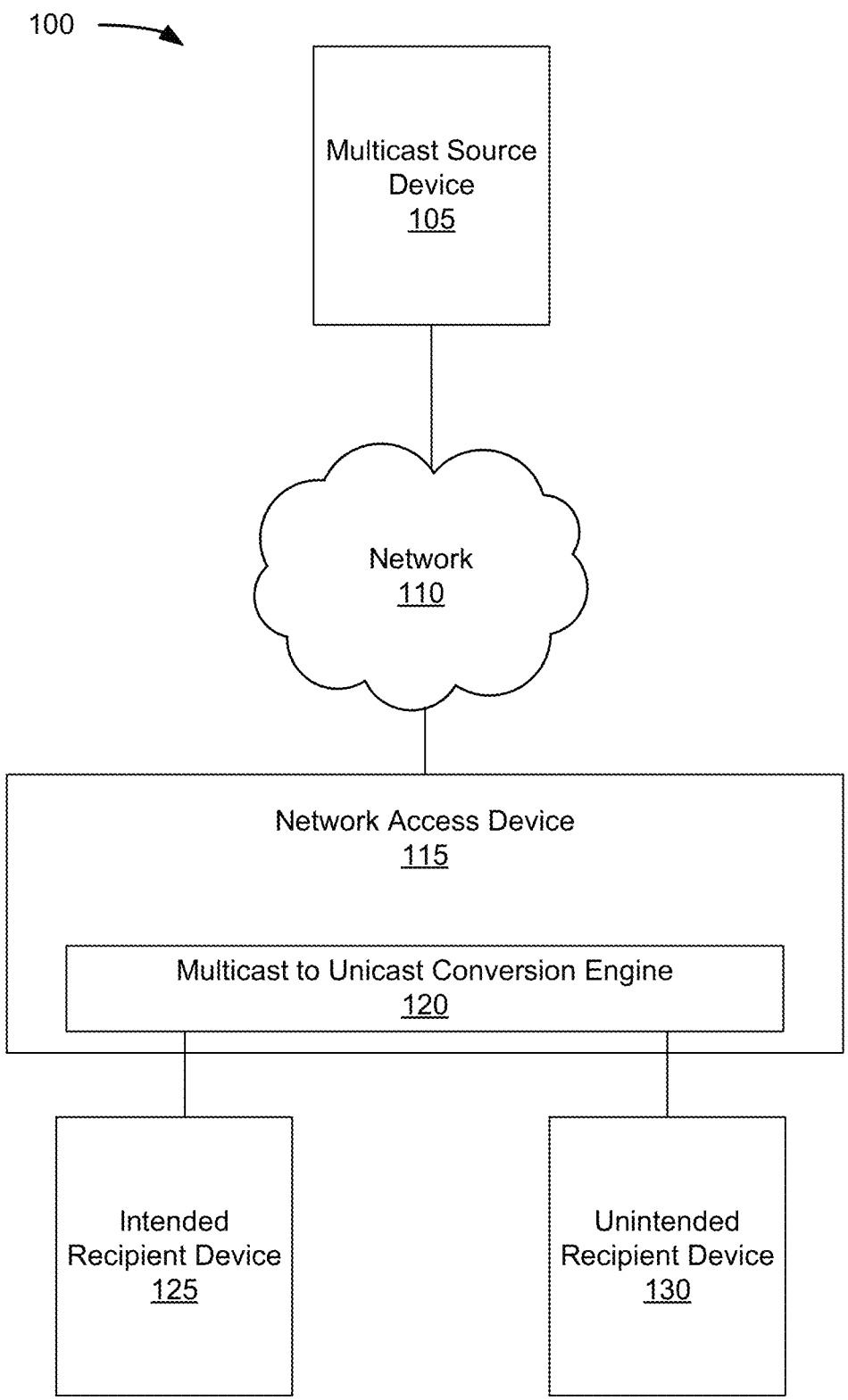
FIG. 1 shows an example of a network environment, according to some implementations.

FIG. 1 shows an example of a network environment 100, according to some implementations. In the example of FIG. 1, the network environment 100 may include a multicast source device 105, a network 110, a network access device 115, an intended recipient device 125, and an unintended recipient device 130. In a specific implementation, the network environment 100 can allow for content to be provided from the multicast source device 105 to the intended recipient device 125 and/or the unintended recipient device 130. The network environment 100 can allow for multicast to unicast conversion techniques as described in this paper.

In the example of FIG. 1, the multicast source device 105 is coupled to the network 110. In various implementations, the multicast source device 105 can include an engine and/or a datastore. An "engine," as used herein, can include a dedicated or shared processor and, typically, firmware or software modules that are executed by the processor. Depending upon implementation-specific or other considerations, an engine can be centralized or its functionality distributed. An engine can include special purpose hardware, firmware, or software embodied in a computer-readable medium for execution by the processor. The term engine can refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip.

The term engine can include memory (shared, dedicated, or group) that stores code executed by the processor. The term code, as used above, can include software, firmware, and/or microcode, and can refer to programs, routines, functions, classes, and/or objects. The term shared, as used above, means that some or all code from multiple engines can be executed using a single (shared) processor. In addition, some or all code from multiple engines can be stored by a single (shared) memory. The term group, as used above, means that some or all code from a single engine can be executed using a group of processors or a group of execution engines. For example, multiple cores and/or multiple threads of a processor can be considered to be execution engines. In various implementations, execution engines can be grouped across a processor, across multiple processors, and across processors in multiple locations, such as multiple servers in a parallel processing arrangement.

A "datastore," as used herein, can be implemented, for example, as software embodied in a physical computer-readable medium on a general- or specific-purpose machine, in firmware, in hardware, in a combination thereof, or in an applicable known or convenient device or system. Datastores described in this paper are intended, if applicable, to include any organization of data, including tables, comma-separated values (CSV) files, traditional databases (e.g., SQL), or other known or convenient organizational formats.

In an example of a system where the datastore is implemented as a database, a database management system (DBMS) can be used to manage the datastore. In such a case, the DBMS can be thought of as part of the datastore or as part of the multicast source device 105, or as a separate functional unit (not shown). A DBMS is typically implemented as an engine that controls organization, storage, management, and retrieval of data in a database. DBMSs frequently provide the ability to query, backup and replicate, enforce rules, provide security, do computation, perform change and access logging, and automate optimization. Examples of DBMSs include Alpha Five, DataEase, Oracle database, IBM DB2, Adaptive Server Enterprise, FileMaker, Firebird, Ingres, Informix, Mark Logic, Microsoft Access, InterSystems Cache, Microsoft SQL Server, Microsoft Visual FoxPro, MonetDB, MySQL, PostgreSQL, Progress, SQLite, Teradata, CSQL, OpenLink Virtuoso, Daffodil DB, and OpenOffice.org Base, to name several.

Database servers can store databases, as well as the DBMS and related engines. Any of the datastores described in this paper could presumably be implemented as database servers. It should be noted that there are two logical views of data in a database, the logical (external) view and the physical (internal) view. In this paper, the logical view is generally assumed to be data found in a report, while the physical view is the data stored in a physical storage medium and available to a specifically programmed processor. With most DBMS implementations, there is one physical view and an almost unlimited number of logical views for the same data.

A DBMS typically includes a modeling language, data structure, database query language, and transaction mechanism. The modeling language is used to define the schema of each database in the DBMS, according to the database model, which can include a hierarchical model, network model, relational model, object model, or some other applicable known or convenient organization. An optimal structure can vary depending upon application requirements (e.g., speed, reliability, maintainability, scalability, and cost). One of the more common models in use today is the ad hoc model embedded in SQL. Data structures can include fields, records, files, objects, and any other applicable known or convenient structures for storing data. A database query language can enable users to query databases, and can include report writers and security mechanisms to prevent unauthorized access. A database transaction mechanism ideally ensures data integrity, even during concurrent user accesses, with fault tolerance. DBMSs can also include a metadata repository; metadata is data that describes other data.

In a specific implementation, the multicast source device 105 can include a digital device and/or a computer system, as discussed in this paper. In some implementations, the multicast source device 105 can have some or all of the elements of the digital device 1500, shown in FIG. 15.

Examples of digital devices include personal computers, networked servers, networked printers and/or peripherals, mobile phones, tablet computing devices, personal data assistants (PDAs), The multicast source device 105 can include a memory and a processor. The multicast source device 105 can be configured similarly to a digital device 1500, shown in FIG. 15. The multicast source device 105 can include an operating system (OS) and/or one or more applications. The OS can include hardware and/or software to manage the hardware of the multicast source device 105 and provide services for applications on the user device 104. Examples of OSs running on the multicast source device 105 can include Android OSs, BSD, iOS, Linux, Mac OS X, Microsoft Windows, Windows Phone, and z/OS. The OS and/or applications on the multicast source device 105 can manage access to the network 110. The applications on the multicast source device 105 can include application software which helps the multicast source device 105 perform tasks beyond the operation of the multicast source device 105.

The OS and/or the applications on the multicast source device 105 can provide network access for the multicast source device 105. For instance, the OS and/or applications on the multicast source device 105 can allow the multicast source device 105 to access information not stored on the multicast source device 105. The network access can include access to the network 110. The network access can be managed by OS routines, by applications involving interactions with a user (e.g., web browsers, email clients, shared directories accessible over the network 110), or other components of the multicast source device 105. In some embodiments, aspects of the network access can be managed by a user of the multicast source device 105. Some aspects of the network access of the multicast source device 105 can also be managed by an Information Technology (IT) administrator who manages other portions of the network 110. The network address can be managed by security applications that execute on the multicast source device 105.

The multicast source device 105 can include a desktop computer, a laptop computer, a mobile phone, a mobile phone with data capabilities (e.g., a "Smartphone"), a tablet computing device, or other digital device. Examples of desktop and laptop computers include Macintosh® computers running some version of Mac OS X and Windows® computers manufactured by an Original Equipment Manufacturer (OEM). Examples of mobile phones and tablet computing devices include Android® devices, devices running a version of iOS®, Blackberries®, and other devices. The multicast source device 105 can be a participant in a Bring Your Own Device (BYOD) scheme.

In a specific implementation, the multicast source device 105 is configured to use general network-addressing protocols. In some implementations, the multicast source device 105 can use dynamic network-addressing protocols, such as Transmission Control Protocol/Internet Protocol (TCP/IP) protocols. As a result, in some implementations, the multicast source device 105 may have a TCP/IP or other dynamic network address that identifies the location of the multicast source device 105 in the network environment 100. The dynamic network address may also include a device identifier of the multicast source device 105. Each data packet coming from the multicast source device 105 can have the network address of the multicast source device 105 appended thereto. Each data packet going to the multicast source device 105 can have the network address of the multicast source device 105 appended thereto. The general network-addressing protocols of the multicast source device 105 can, in some embodiments, be compatible with a service, such as the Bonjour® service.

In an implementation, the multicast source device 105 may provide multicasts to other devices in the network environment 100. A "multicast," as used herein, may include a message, advertisement, or other communication to a plurality of devices coupled to the network 110. In an IEEE 802.11 context, a multicast can be referred to as a medium access control (MAC) address that has a group bit set. In 802.11, a multicast MAC service data unity (MSDU) is one with a multicast destination address and a multicast MAC protocol data unity (MPDU) or control frame is one with a multicast receiver address. In some implementations, the multicast may have device-level source and destination addresses, and network-layer source and destination addresses. The device-level source address of a multicast can include the device-level address (e.g., a L2 address such as a MAC identifier) of the source of the multicast (e.g., the device-level address of multicast source device 105). The device-level destination address of a multicast can include device-level addresses of all devices in a network environment (e.g., device-level addresses of all of the devices in the network environment 100). The network-level source address of a multicast can include the network-level address (e.g., a L3 address such as TCP/IP address) of the source of the multicast (e.g., the network-level address of multicast source device 105). The network-level destination address of a multicast can include a network-level address of a destination device in a network environment (e.g., the network-level address of the intended recipient device 125).

A "unicast," as used herein, may include a message, advertisement, or other communication to a device coupled to the network 110. In an 802.11 context, a unicast frame can be referred to as a frame addressed to a single recipient, not a broadcast or multicast frame. (A synonym for "unicast" in 802.11 is "directed address"). In some implementations, the unicast may have device-level source and destination addresses, and network-layer source and destination addresses. The device-level source address of a unicast can include the device-level address of the source of the unicast. The device-level destination address of a unicast can include device-level addresses of intended destinations of the unicast. The network-level source address of a unicast can include the network-level address of the source of the unicast. The network-level destination address of a unicast can include a network-level address of a destination device in a network environment.

In the example of FIG. 1, the network 110 is coupled to the multicast source device 105 and the network access device 115. In a specific implementation, the network 110 includes a networked system including several computer systems coupled together, such as the Internet, or a device for coupling components of a single computer, such as a bus. The term "Internet" as used in this paper refers to a network of networks using certain protocols, such as the TCP/IP protocol, and possibly other protocols such as the hypertext transfer protocol (HTTP) for hypertext markup language (HTML) documents making up the World Wide Web (the web). Content is often provided by content servers, which are referred to as being "on" the Internet. A web server, which is one type of content server, is typically at least one computer system, which operates as a server computer system and is configured to operate with the protocols of the web and is coupled to the Internet. The physical connections of the Internet and the protocols and communication procedures of the Internet and the web are well known to those of skill in the relevant art. For illustrative purposes, it is assumed the network 110 broadly includes, as understood from relevant context, anything from a minimalist coupling of the components illustrated in the example of FIG. 1, to every component of the Internet and networks coupled to the Internet. In some implementations, the network 110 is administered by a service provider, such as an Internet Service Provider (ISP).

In various implementations, the network 110 may include technologies such as Ethernet, 802.11, worldwide interoperability for microwave access (WiMAX), 3G, 4G, CDMA, GSM, LTE, digital subscriber line (DSL), etc. The network 110 may further include networking protocols such as multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over network 110 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In a specific implementation, the network 110 includes a wired network using wires for at least some communications. In some implementations, the network 110 comprises a wireless network. A "wireless network," as used in this paper may include any computer network communicating at least in part without the use of electrical wires. In various implementations, the network 110 includes technologies such as Ethernet, 802.11, worldwide interoperability for microwave access (WiMAX), 3G, 4G, CDMA, GSM, LTE, digital subscriber line (DSL), etc. The network 110 can further include networking protocols such as multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 110 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In a specific implementation, the wireless network of the network 110 is compatible with the 802.11 protocols specified by the Institute of Electrical and Electronics Engineers (IEEE). In a specific implementation, the wireless network of the network 110 is compatible with the 802.3 protocols specified by the IEEE. In some implementations, IEEE 802.3 compatible protocols of the network 110 may include local area network technology with some wide area network applications. Physical connections are typically made between nodes and/or infrastructure devices (hubs, switches, routers) by various types of copper or fiber cable. The IEEE 802.3 compatible technology can support the IEEE 802.1 network architecture of the network 110.

In a specific implementation, the network 110 can include trusted resources administered by a security device such as a switch, a firewall, a router, or a gateway. As used herein "trusted resources" are secure resources that are available in areas administered by the security device but are unavailable outside the areas administered by the security device. It is noted that a device can be able to access the trusted resources without directly being coupled to the trusted network, e.g., by establishing a logical or virtual presence on the trusted resources. The trusted resources can include resources of a LAN, a WAN, or a MAN, or portions thereof. The trusted resources can include portions of the Internet. For instance, the trusted resources can include secure portions of Internet-accessible resources (e.g., cloud-based resources).

In some implementations, the trusted resources of the network 110 can have a geographical component. That is, the trusted resources can be limited to a specified geographical locale, such as a hospital, a community, a school, an organization, or a particular office building, for instance. The trusted resources, in various embodiments, can be managed by a common entity, such as an organization that has multiple locations. For instance, the trusted resources can comprise a common network maintained by multiple offices of a specific organization, such as a corporation. The resources can be limited to a class of devices seeking to access a trusted resource. For example, the resources can include a network of iPhones® (or other devices) trying to access a resource available only to iPhones®. As another example, the trusted resources can be limited to a class of devices having a common processing power and/or a common network capability.

In various implementations, the network 110 can include untrusted resources. The untrusted resources can, in some implementations, include portions of the Internet. Access to the untrusted resources may or may not be administered by the security device that administers trusted resources of the network 110.

In the example of FIG. 1, the network access device 115 is coupled to the network 110, to the intended recipient device 125, and to the unintended recipient device 130. In some implementations, the network access device 115 can provide the intended recipient device 125 and the unintended recipient device 130 with access to resources of the network 110. The network access device 115 can, in some implementations, provide network security for one or more of the intended recipient device 125 and the unintended recipient device 130. In various implementations, the network access device 115 can maintain trusted resources of the network 110. The network access device 115 can be configured as an access point, a router, a switch, a firewall, or a gateway. In some implementations, the network access device 115 can be implemented as one or more of the devices shown in FIG. 16.

In the example of FIG. 1, the network access device 115 comprises a multicast to unicast conversion engine 120. In an implementation, the multicast to unicast conversion engine 120 receives multicasts from the multicast source device 105. The multicast to unicast conversion engine 120 further converts the multicasts to unicasts to be directed to the intended recipient device 125. The multicast to unicast conversion engine 120 also blocks the multicasts from being directed to the unintended recipient device 130.

In various implementations, the multicast to unicast conversion engine 120 allows network administrators to better control devices using multicast protocols, including devices using multicast Domain Name Server (mDNS) protocols. The multicast to unicast conversion engine 120 further allows per-device or other per-destination filtering of network traffic from devices using multicast protocols. More specifically, in some implementations, devices (e.g., the intended recipient device 125 and/or the unintended recipient device 130) can be able to receive messages as link-layer (i.e., layer-2) unicast messages. In various implementations, the multicast to unicast conversion engine 120 can use this capability to restrict visibility of messages from the multicast to unicast conversion engine 120 to only one device and/or to select devices.

In some implementations, the multicast to unicast conversion engine 120 implements multicast to unicast conversion in a user space of a kernel of the network access device 115. By using the user space of the kernel of the network access device 115, various implementations of the multicast to unicast conversion engine 120 are able to access network control information (including authorized users of the network 110) and to maintain multicast to unicast conversion code, particularly if the kernel of the network access device 115 is to be updated, with e.g., new versions of the operating system. Moreover, implementing multicast to unicast conversion in the user space of the kernel of the network access device 115 can also allow the kernel of the network access device 115 to filter traffic to particular users, particular devices, particular groups of users and/or devices, etc. Though implementation in user space can require additional processing for each item of network traffic, it is noted mDNS traffic is a small component of overall network traffic, and that the code for conversion from multicasts to unicasts need not be in the forwarding path of networking traffic. Such an interface can enable a transparent proxy for the multicast to unicast conversion engine 120.

Figure 2:
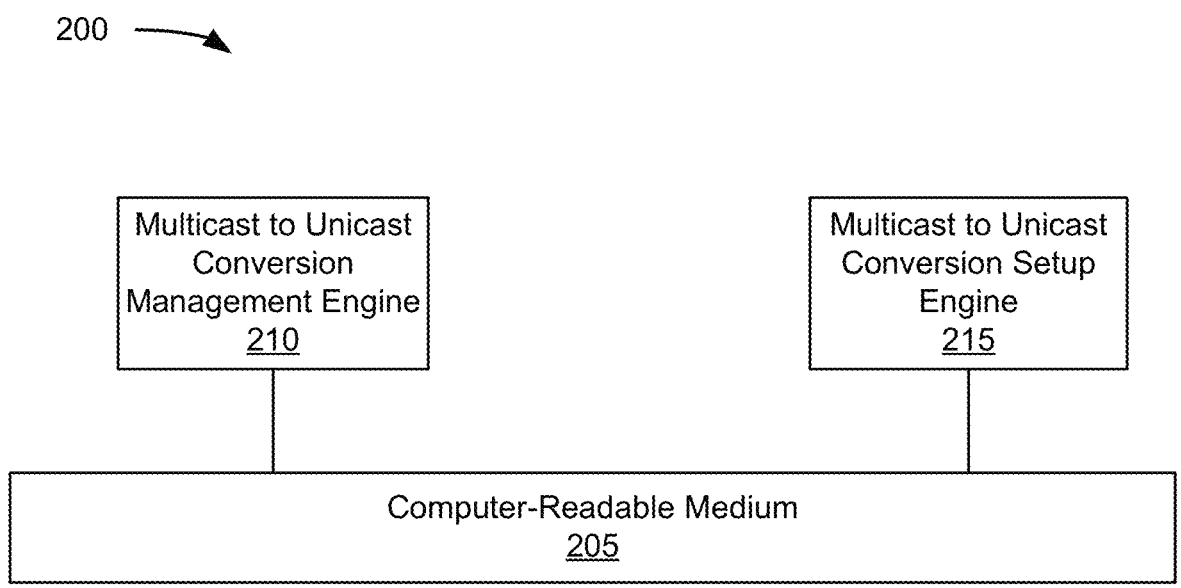
FIG. 2 shows an example of a multicast to unicast conversion engine, according to some implementations.

Moreover, in various implementations, implementing the multicast to unicast conversion in a user space of the kernel of the multicast to unicast conversion engine 120 can allow the operating system of the multicast to unicast conversion engine 120 to be used in wire mode and still perform per-user filtering. In the case where multicast to unicast conversion engine 120 performs multicast-to-unicast conversion, the multicast to unicast conversion engine 120 will receive all multicast frames on the wired network, convert them to unicast (i.e., in L2) frames for transmission through the network access device 115, and proper operation will depend on having L2 multicast frames blocked by the network access device 115. User-based conversion in the case of a wired device will require that multicast frames from the multicast source device 105 be blocked at the destination port of the multicast to unicast conversion engine 120 and be replaced, by the multicast to unicast conversion engine 120, by frames converted to unicast. FIG. 2 further shows implementations of the multicast to unicast conversion engine 120 in greater detail.

In the example of FIG. 1, the intended recipient device 125 is coupled to the multicast to unicast conversion engine 120. In an implementation, the intended recipient device 125 can represent an intended recipient of a multicast from the multicast source device 105. In various implementations, the intended recipient device 125 can include an engine and/or a datastore. In a specific implementation, the intended recipient device 125 can include a digital device and/or a computer system, as discussed in this paper. In a specific implementation, the intended recipient device 125 is configured to use general network-addressing protocols. In an implementation, the intended recipient device 125 may receive unicasts from other devices in the network environment 100. In various implementations, the intended recipient device 125 can represent one or more of: a particular device or particular devices, one or more devices associated with a particular user, one or more devices associated with a particular user profile for the network 110, one or more devices associated with a particular private pre-shared key (PPSK), and/or one or more devices associated with a particular virtual local area network (VLAN). FIGS. 8-14 show examples of how the intended recipient device 125 can represent one or more of: a particular device or particular devices, one or more devices associated with a particular user, one or more devices associated with a particular user profile for the network 110, one or more devices associated with a particular private pre-shared key (PPSK), and/or one or more devices associated with a particular virtual local area network (VLAN).

In the example of FIG. 1, the unintended recipient device 130 is coupled to the multicast to unicast conversion engine 120. In an implementation, the unintended recipient device 130 can represent an intended recipient of a multicast from the multicast source device 105. In various implementations, the unintended recipient device 130 can include an engine and/or a datastore. In a specific implementation, the unintended recipient device 130 can include a digital device and/or a computer system, as discussed in this paper. In a specific implementation, the unintended recipient device 130 is configured to use general network-addressing protocols. In an implementation, the unintended recipient device 130 may receive unicasts from other devices in the network environment 100. In various implementations, the unintended recipient device 130 can represent an unintended recipient of a multicast from the multicast source device 105. More specifically, the unintended recipient device 130 can represent one or more devices that would normally receive a multicast from the multicast source device 105, but are not intended as recipients to the multicast.

FIG. 2 shows an example of a multicast to unicast conversion engine 200, according to some implementations. In some implementations, some or all of the multicast to unicast conversion engine 200 can correspond to some or all of the multicast to unicast conversion engine 120, shown in FIG. 1. In the example of FIG. 2, the multicast to unicast conversion engine 200 includes a computer-readable medium 205, a multicast to unicast conversion management engine 210, and a multicast to unicast conversion setup engine 215. One or more of the multicast to unicast conversion management engine 210 and the multicast to unicast conversion setup engine 215 can include an "engine," as described herein.

In the example of FIG. 2, the computer-readable medium 205 is coupled to the multicast to unicast conversion management engine 210 and the multicast to unicast conversion setup engine 215. The computer-readable medium 205 can include a "computer-readable medium," examples of which are given herein. The computer-readable medium 205 can also couple the components (e.g., the multicast to unicast conversion management engine 210 and the multicast to unicast conversion setup engine 215) of the multicast to unicast conversion engine 200 to external devices, such portions of the network access device 115, shown in FIG. 1.

In the example of FIG. 2, the multicast to unicast conversion management engine 210 is coupled to the computer-readable medium 205. In a specific implementation, the multicast to unicast conversion management engine 210 manages multicast to unicast conversion for the multicast to unicast conversion engine 200. More specifically, the multicast to unicast conversion management engine 210 can receive a multicast from a multicast source device (e.g., the multicast source device 105, shown in FIG. 1). The multicast to unicast conversion management engine 210 can also convert the multicast into a unicast for an intended recipient device (e.g., the intended recipient device 125, shown in FIG. 1). In various implementations, the multicast to unicast conversion management engine 210 can block the unicast from reaching an unintended recipient device (e.g., the unintended recipient device 130, shown in FIG. 1). In various implementations, the multicast to unicast conversion management engine 210 is configured to execute at least portions in a user space of a kernel of the multicast to unicast conversion engine 200.

In the example of FIG. 2, the multicast to unicast conversion setup engine 215 is coupled to the computer-readable medium 205. In various implementations, the multicast to unicast conversion setup engine 215 can instruct the multicast to unicast conversion management engine 210 to monitor network traffic for multicasts. The multicast to unicast conversion setup engine 215 can also set up multicast to unicast conversion for all multicasts in a network (e.g., the network 110, shown in FIG. 1).

Figure 3:
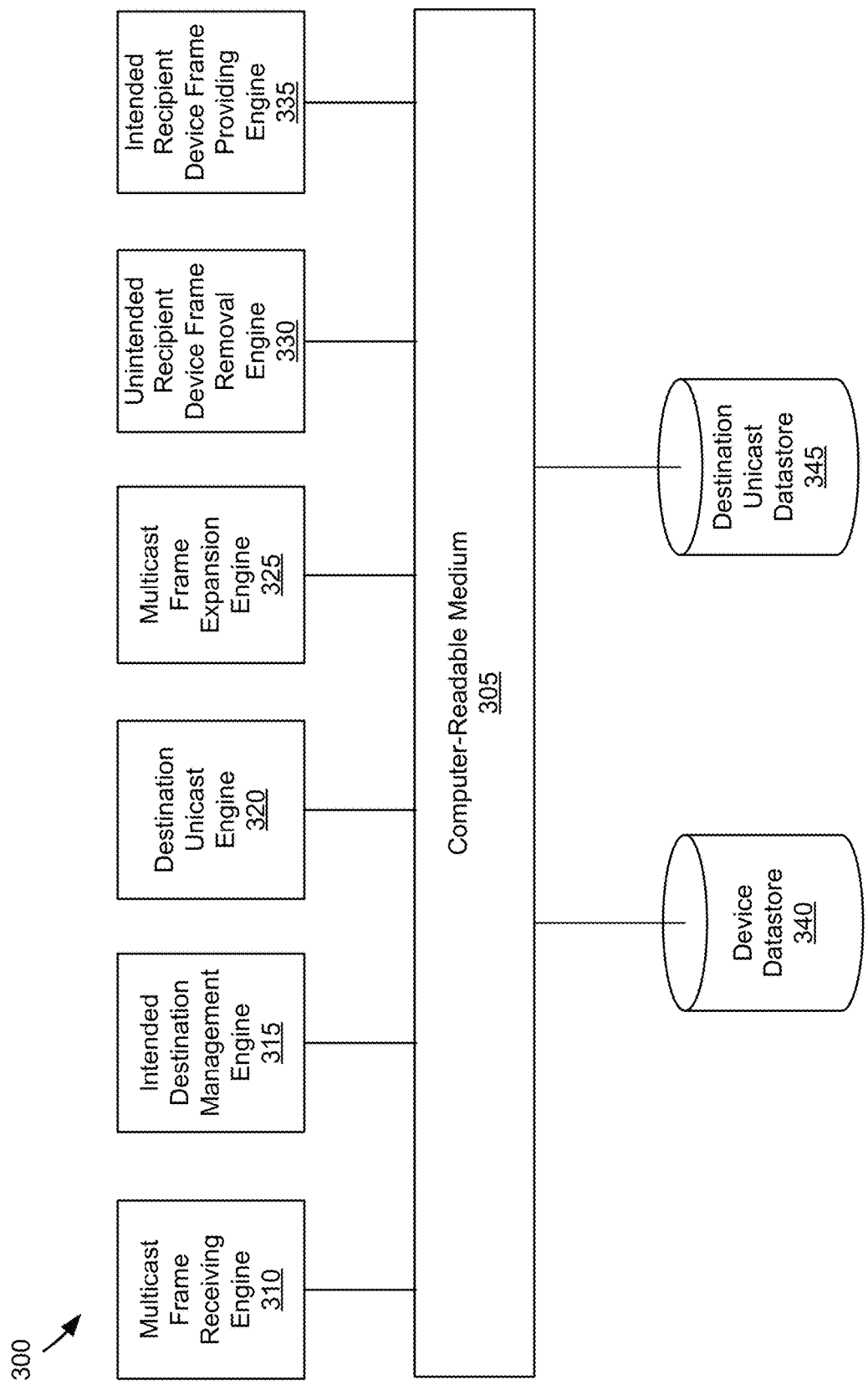
FIG. 3 shows an example of a multicast to unicast conversion management engine, according to some implementations.

FIG. 3 shows an example of a multicast to unicast conversion management engine 300, according to some implementations. In some implementations, some or all of the multicast to unicast conversion management engine 300 can correspond to some or all of the multicast to unicast conversion management engine 210, shown in FIG. 2. In the example of FIG. 3, the multicast to unicast conversion management engine 300 can include a computer-readable medium 305, a multicast frame receiving engine 310, an intended destination management engine 315, a destination unicast engine 320, a multicast frame expansion engine 325, unintended recipient device frame removal engine 330, an intended recipient device frame providing engine 335, a device datastore 340, and a destination unicast datastore 345. One or more of the multicast frame receiving engine 310, the intended destination management engine 315, the destination unicast engine 320, the multicast frame expansion engine 325, the unintended recipient device frame removal engine 330, and the intended recipient device frame providing engine 335 can include an "engine," as described herein. One or more of the device datastore 340 and the destination unicast datastore 345 can include a "datastore," as described herein. In some implementations, some or all of the multicast to unicast conversion management engine 300 resides in a user space of a kernel of a network access device, such as the network access device 115 shown in FIG. 1.

In the example of FIG. 3, the computer-readable medium 305 is coupled to the multicast frame receiving engine 310, the intended destination management engine 315, the destination unicast engine 320, the multicast frame expansion engine 325, the unintended recipient device frame removal engine 330, the intended recipient device frame providing engine 335, the device datastore 340, and the destination unicast datastore 345. The computer-readable medium 305 can include a "computer-readable medium," examples of which are given herein. In some implementations, the computer-readable medium 305 can couple components (e.g., the multicast frame receiving engine 310, the intended destination management engine 315, the destination unicast engine 320, the multicast frame expansion engine 325, the unintended recipient device frame removal engine 330, the intended recipient device frame providing engine 335, the device datastore 340, and the destination unicast datastore 345) of the multicast to unicast conversion management engine 300 to external devices, such as portions of the multicast to unicast conversion engine 200, shown in FIG. 2.

In the example of FIG. 3, the multicast frame receiving engine 310 is coupled to the computer-readable medium 305. In a specific implementation, the multicast frame receiving engine 310 can receive multicast frames from a network. The multicast frame receiving engine 310 can be incorporated as part of a network interface of a multicast to unicast conversion engine (e.g., the multicast to unicast conversion engine 120 in FIG. 1 and/or the multicast to unicast conversion engine 200 in FIG. 2). In various embodiments, the multicast frame receiving engine 310 can monitor the network interface for the presence of multicasts. Attributes of network traffic that can be monitored include L2 and L3 information in the header of specific packets to the multicast frame receiving engine 310. In some implementations, the multicast frame receiving engine 310 can receive data formatted as a multicast from a multicast source device (e.g., the multicast source device 105, shown in FIG. 1). The multicast frame receiving engine In the example of FIG. 3, the intended destination management engine 315 is coupled to the computer-readable medium 305. In some implementations, the intended destination management engine 315 can review portions of traffic (e.g., headers of packets) from a network, such as the network 110. The intended destination management engine 315 can further extract network address information, such as L2 (e.g., destination MAC addresses) and/or L3 (e.g., destination TCP/IP addresses) to determine where network traffic is to be directed. In various implementations, the intended destination management engine 315 can correlate extracted network location information with devices in the device datastore 340. In a specific implementation, the intended destination management engine 315 can identify one or more intended destination devices (e.g., the intended recipient device 125, shown in FIG. 1) of the network traffic using the correlation.

In the example of FIG. 3, the destination unicast engine 320 is coupled to the computer-readable medium 305. In some implementations, the destination unicast engine 320 can identify one or more destination unicast addresses for the multicast frames. In an implementation, the destination unicast engine 320 can look up unicast addresses corresponding to the one or more intended destination devices. The destination unicast engine 320 can look up unicast addresses stored in the destination unicast datastore 345. In some implementations, at least portions of the unicast addresses may correspond to network addresses of the intended destination devices. For instance, at least portions of the unicast addresses may have L2 or L3 information corresponding to L2 or L3 network addresses of the intended destination devices.

In the example of FIG. 3, the multicast frame expansion engine 325 is coupled to the computer-readable medium 305. In a specific implementation, the multicast frame expansion engine 325 can create a plurality of unicast frames for a given multicast frame. The multicast frame expansion engine 325 can further copy the payload of the given multicast frame into the payloads of each of the plurality of unicast frames. The multicast frame expansion engine 325 can further provide the unicast address of recipient device(s) into the header of each of the plurality of unicast frames. As a result, in some implementations, the multicast frame expansion engine 325 can expand a multicast packet into a series of unicast frames, each of the series of frames corresponding to a destination unicast address. The resulting set of expanded frames can comprise a series of unicast frames directed to all devices in the network. More specifically, the resulting set of expanded frames can include unicast frames directed to intended devices on the network and unicast frames directed to unintended devices on the network. In various implementations, the multicast frame expansion engine 325 is configured to create the plurality of unicast frames for the given multicast frame in a user space of a kernel of the multicast to unicast conversion management engine 300.

In the example of FIG. 3, the unintended recipient device frame removal engine 330 is coupled to the computer-readable medium 305. In some implementations, the unintended recipient device frame removal engine 330 can remove unicast frames directed toward one or more unintended recipient devices. For example, in an implementation, the unintended recipient device frame removal engine 330 can remove unicast frames directed toward the unintended recipient device 130, shown in FIG. 1. In some implementations, the unintended recipient device frame removal engine 330 can delete unwanted unicast frames, while in various implementations, the unintended recipient device frame removal engine 330 can cache the unwanted unicast frames in a specified location. It is noted the unintended recipient device frame removal engine 330 can filter the unicast frames in other ways as well. In various implementations, the unintended recipient device frame removal engine 330 is configured to remove unintended frames in the user space of the kernel of the multicast to unicast conversion management engine 300.

In the example of FIG. 3, the intended recipient device frame providing engine 335 is coupled to the computer-readable medium 305. In various implementations, the intended recipient device frame providing engine 335 can provide the unicast frames to one or more intended recipient devices. For instance, in some implementations, the intended recipient device frame providing engine 335 can provide to the intended recipient device 125 (shown in FIG. 1) the unicast frames directed toward the intended recipient device 125. The intended recipient device frame providing engine 335 can also cache and/or otherwise store the unicast frames directed toward intended recipient devices in various implementations.

In the example of FIG. 3, the device datastore 340 is coupled to the computer-readable medium 305. In an specific implementation, the device datastore 340 can store a list of devices on a network (e.g., devices on the network 110, shown in FIG. 1). The list of devices can also have an entry for a network address (e.g., L2 and/or L3 address) for each device. In the example of FIG. 3, the destination unicast datastore 345 is coupled to the computer-readable medium 305. In an implementation, the destination unicast datastore 345 can include a list of intended recipient devices to which unicasts are directed. The list of intended recipient devices can include network addresses of intended recipient devices.

Figure 4:
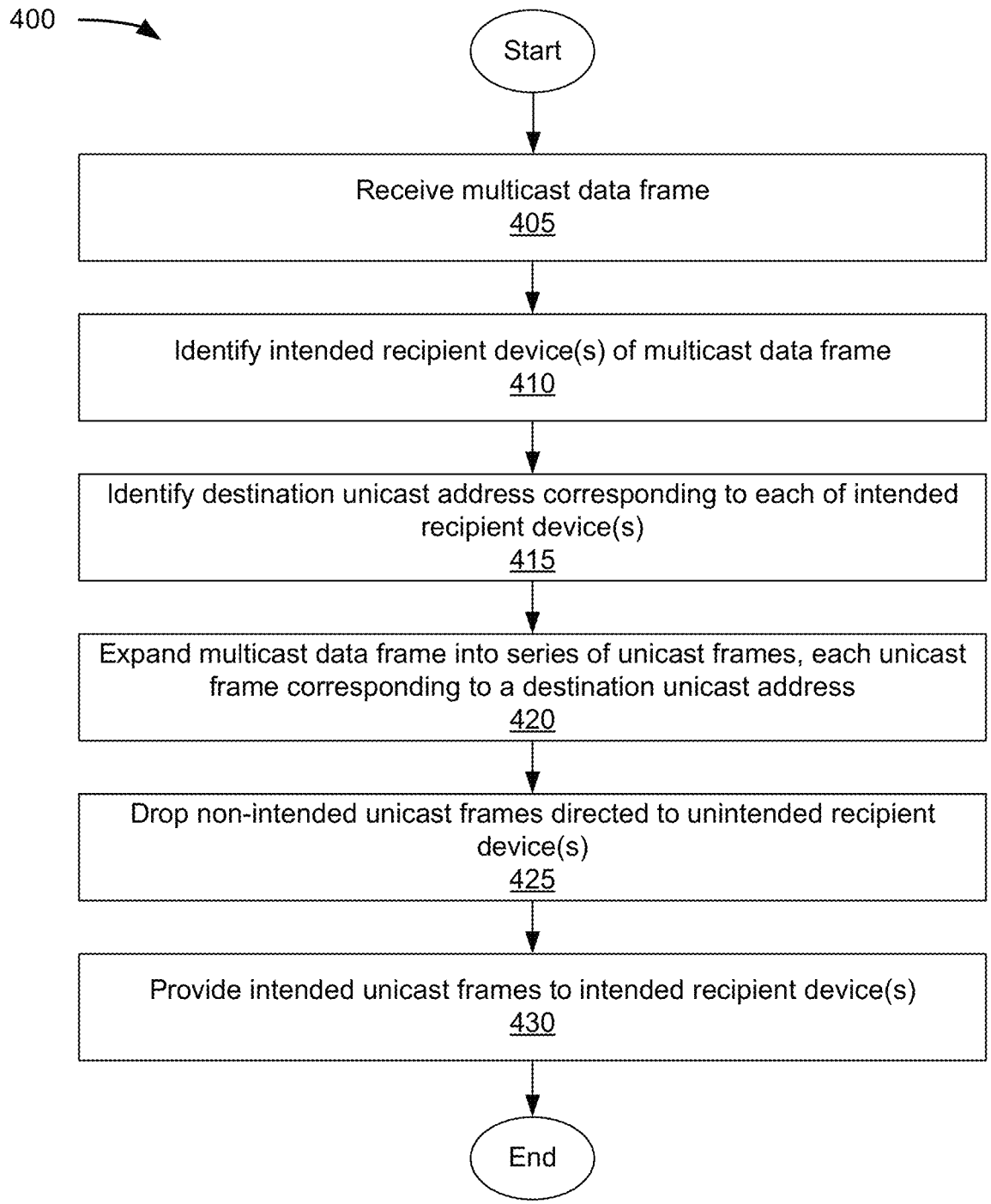
FIG. 4 shows an example of a flowchart of a method for performing multicast to unicast conversion, according to some implementations.

FIG. 4 shows an example of a flowchart 400 of a method for performing multicast to unicast conversion, according to some implementations. The flowchart 400 is discussed in conjunction with the multicast to unicast conversion management engine 300. It is noted the flowchart 400 can include fewer or additional blocks without departing from the scope and substance of the inventive concepts herein.

At block 405, the multicast frame receiving engine 310 receives a multicast data frame. In some implementations, the multicast frame receiving engine 310 can receive a multicast data frame from a multicast source device (e.g., the multicast source device 105 shown in FIG. 1). The multicast data frame may include, as part of its header, L2 information about a plurality of devices coupled to a network (e.g., the network 110 shown in FIG. 1). The multicast data frame may also include, as part of its header, L3 information about intended recipient devices (e.g., the intended recipient device 125) to which the multicast data frame is to be directed. The multicast data frame may further include data as part of its payload. Examples of data include content that is to be directed toward the intended recipient devices. For instance, in an implementation, the multicast data frame can include images, sounds, video, or streaming content to be sent to the intended recipient device.

At block 410, the intended destination management engine 315 identifies one or more intended recipient devices of the multicast data frame. In various implementations, the intended destination management engine 315 can review the header of the multicast data frame to identify an intended recipient device that the multicast data frame was directed to. In some embodiments, the intended destination management engine 315 can identify a network address, such as a L3 address, of the intended recipient device. For instance, the intended destination management engine 315 can identify a TCP/IP address of the intended recipient device, in various implementations. The intended destination management engine 315 can provide the identified one or more intended recipient devices to the destination unicast engine 320.

At block 415, the destination unicast engine 320 identifies a destination unicast address corresponding to each of the one or more intended recipient devices. In some implementations, the destination unicast engine 320 can look up the each destination unicast address of identified one or more recipient devices from the device datastore 340. The destination unicast engine 320 can provide each destination unicast address to the multicast frame expansion engine 325.

At block 420, the multicast frame expansion engine 325 expands the multicast data frame into a series of unicast data frames, each of the unicast data frames corresponding to a destination unicast address. In some implementations, the multicast frame expansion engine 325 can create a set of unicast data frames corresponding to the multicast data frame. Each of the set of unicast data frames can have, as its payload, contents that correspond to the contents of the multicast data frame. Each of the set of unicast data frames can have, as its header, the destination unicast address of the intended recipient device(s) the unicast data frames is directed to. In some implementations, the multicast frame expansion engine 325 can provide the set of unicast data frames to one or more of the unintended recipient device frame removal engine 330 and the intended recipient device frame providing engine 335.

At block 425, the unintended recipient device frame removal engine 330 drops non-intended unicast frames directed to unintended recipient devices. In some implementations, the unintended recipient device frame removal engine 330 can review the header of each of the set of unicast data frames. The unintended recipient device frame removal engine 330 can further look up, in the destination unicast datastore 345, whether each of the set of unicast data frames is directed toward one or more intended recipient devices. The unintended recipient device frame removal engine 330 can further drop, i.e., block, unicast data frames directed toward unintended recipient devices.

At block 430, the intended recipient device frame providing engine 335 provides the intended unicast frames to the intended recipient devices. In some implementations, the intended recipient device frame providing engine 335 can review the header of each of the set of unicast data frames. The intended recipient device frame providing engine 335 can further look up, in the destination unicast datastore 345, whether each of the set of unicast data frames is directed toward one or more intended recipient devices. The intended recipient device frame providing engine 335 can further allow unicast data frames directed toward intended recipient devices to go to those intended recipient devices.

Figure 5:
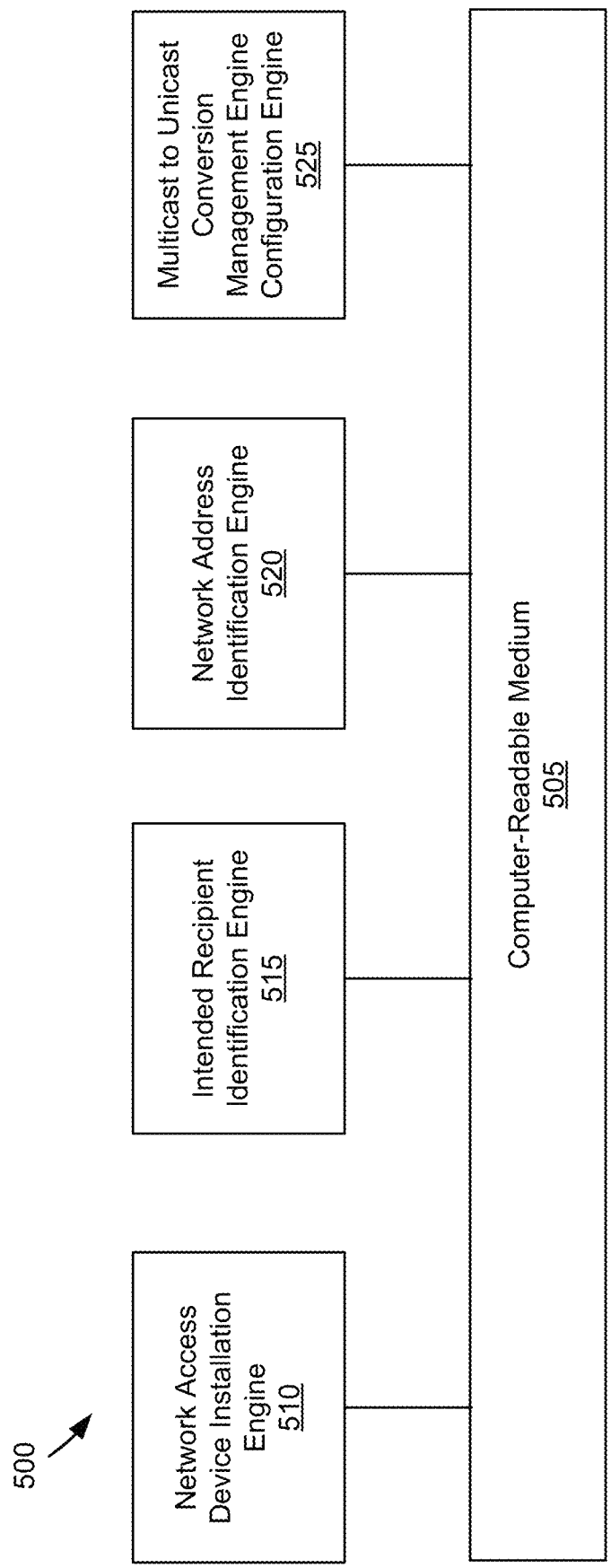
FIG. 5 shows an example of a multicast to unicast setup engine, according to some implementations.

FIG. 5 shows an example of a multicast to unicast conversion setup engine 500, according to some implementations. In some implementations, some or all of the multicast to unicast conversion setup engine 500 can correspond to some or all of the multicast to unicast conversion setup engine 215, shown in FIG. 2. In the example of FIG. 5, the multicast to unicast conversion setup engine 500 includes a computer-readable medium 505, a network access device installation engine 510, an intended recipient identification engine 515, a network address identification engine 520, and a multicast to unicast conversion management engine configuration engine 525. One or more of the computer-readable medium 505, the network access device installation engine 510, the intended recipient identification engine 515, the network address identification engine 520, and the multicast to unicast conversion management engine configuration engine 525 can include an "engine," as described herein.

In the example of FIG. 5, the computer-readable medium 505 is coupled to the network access device installation engine 510, the intended recipient identification engine 515, the network address identification engine 520, and the multicast to unicast conversion management engine configuration engine 525. The computer-readable medium 505 can include a "computer-readable medium," examples of which are given herein. In some implementations, the computer-readable medium 505 can couple components (e.g., the network access device installation engine 510, the intended recipient identification engine 515, the network address identification engine 520, and the multicast to unicast conversion management engine configuration engine 525) of the multicast to unicast conversion setup engine 500 to external devices, such as portions of the multicast to unicast conversion engine 200, shown in FIG. 2.

In the example of FIG. 5, the network access device installation engine 510 is coupled to the computer-readable medium 505. In some implementations, the network access device installation engine 510 can install an access point on a network. For instance, the network access device installation engine 510 can install the network access device 115 on the network 110, both shown in FIG. 1. To this end, the network access device installation engine 510 can configure portions of the network access device (e.g., drivers and/or applications executing on the network access device) to send and receive data passing through the network.

In the example of FIG. 5, the intended recipient identification engine 515 is coupled to the computer-readable medium 505. In various implementations, the intended recipient identification engine 515 can identify devices that can serve as intended recipient devices on the network. For instance, the intended recipient identification engine 515 can identify particular devices that are to receive unicasts based on converted multicasts. In various implementations, the intended recipient identification engine 515 can also identify one or more of: a particular device or particular devices, one or more devices associated with a particular user, one or more devices associated with a particular user profile for the network 110, one or more devices associated with a particular private pre-shared key (PPSK), and/or one or more devices associated with a particular virtual local area network (VLAN).

In the example of FIG. 5, the network address identification engine 520 is coupled to the computer-readable medium 505. In an implementation, the network address identification engine 520 can identify a network address of a device on the network. For instance, the network address identification engine 520 can, in implementations, identify L2 and/or L3 network address information of the intended recipient device 125 and/or the unintended recipient device 130, shown in FIG. 1. In the example of FIG. 5, the multicast to unicast conversion management engine configuration engine 525 is coupled to the computer-readable medium 505. In various implementations, the multicast to unicast conversion management engine configuration engine 525 can configure a multicast to unicast conversion management engine (e.g., the multicast to unicast conversion management engine 210 in FIG. 2 and/or the multicast to unicast conversion management engine 300 in FIG. 3) to convert multicasts to unicasts directed to intended recipient devices. In various implementations, the multicast to unicast conversion management engine configuration engine 525 can interact with drivers and/or applications on the multicast to unicast conversion management engine to redirect network traffic to intended recipient devices.

Figure 6:
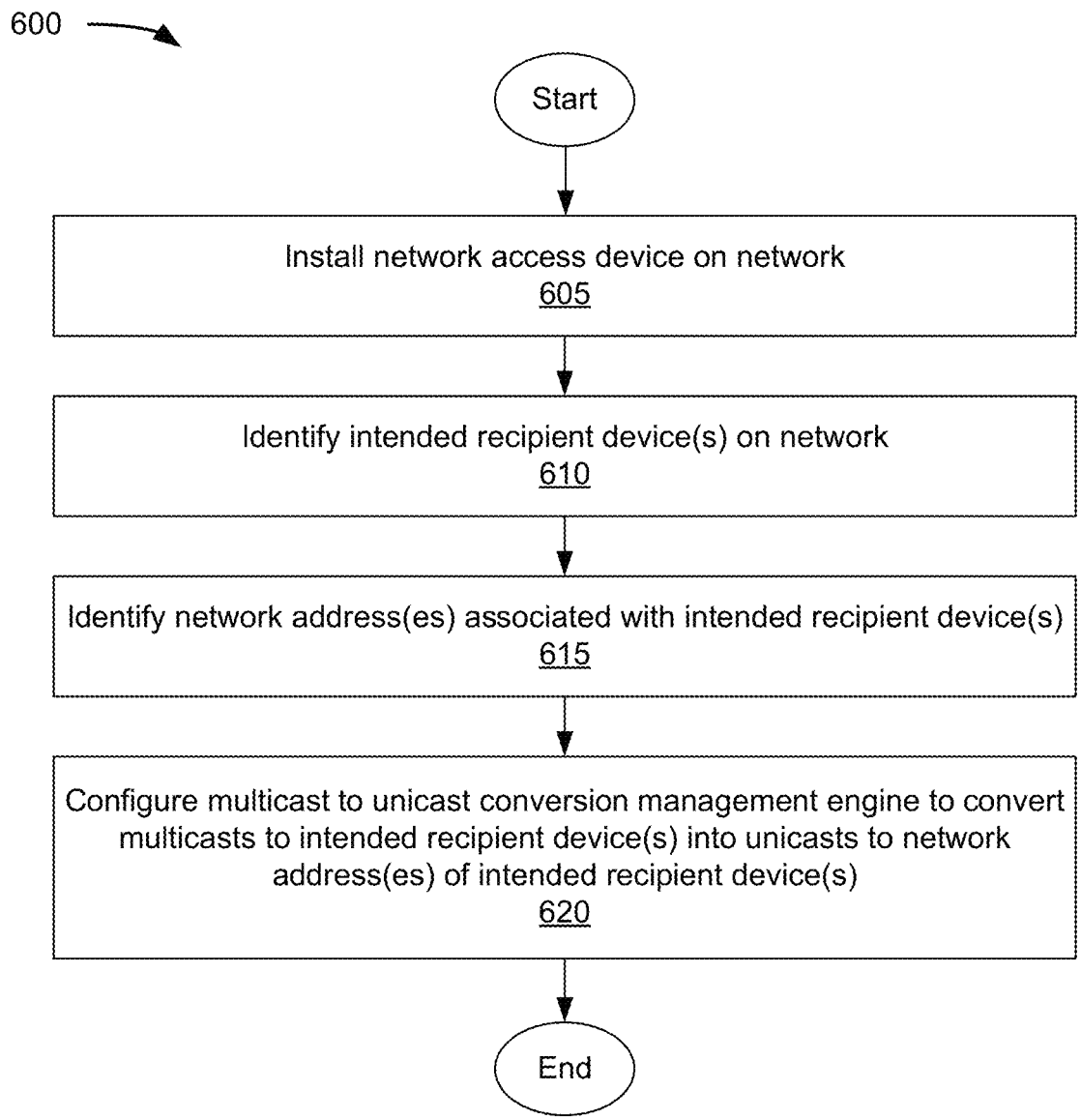
FIG. 6 shows an example of a flowchart of a method for setting up multicast to unicast conversion, according to some implementations.

FIG. 6 shows an example of a flowchart 600 of a method for setting up multicast to unicast conversion, according to some implementations. The flowchart 600 is discussed in conjunction with the multicast to unicast conversion setup engine 500. It is noted the flowchart 600 can include fewer or additional blocks without departing from the scope and substance of the inventive concepts herein. At block 605, the network access device installation engine 510 installs a network access device on the network. At block 610, the intended recipient identification engine 515 identifies one or more intended recipient devices on the network. At block 615, the network address identification engine 520 identifies one or more network addresses associated with the one or more intended recipient devices on the network. At block 620, the multicast to unicast conversion management engine configuration engine 525 configures a multicast to unicast conversion management engine to convert multicasts to the one or more intended recipient devices into unicasts to the one or more network addresses of the one or more intended recipient devices.

Figure 7:
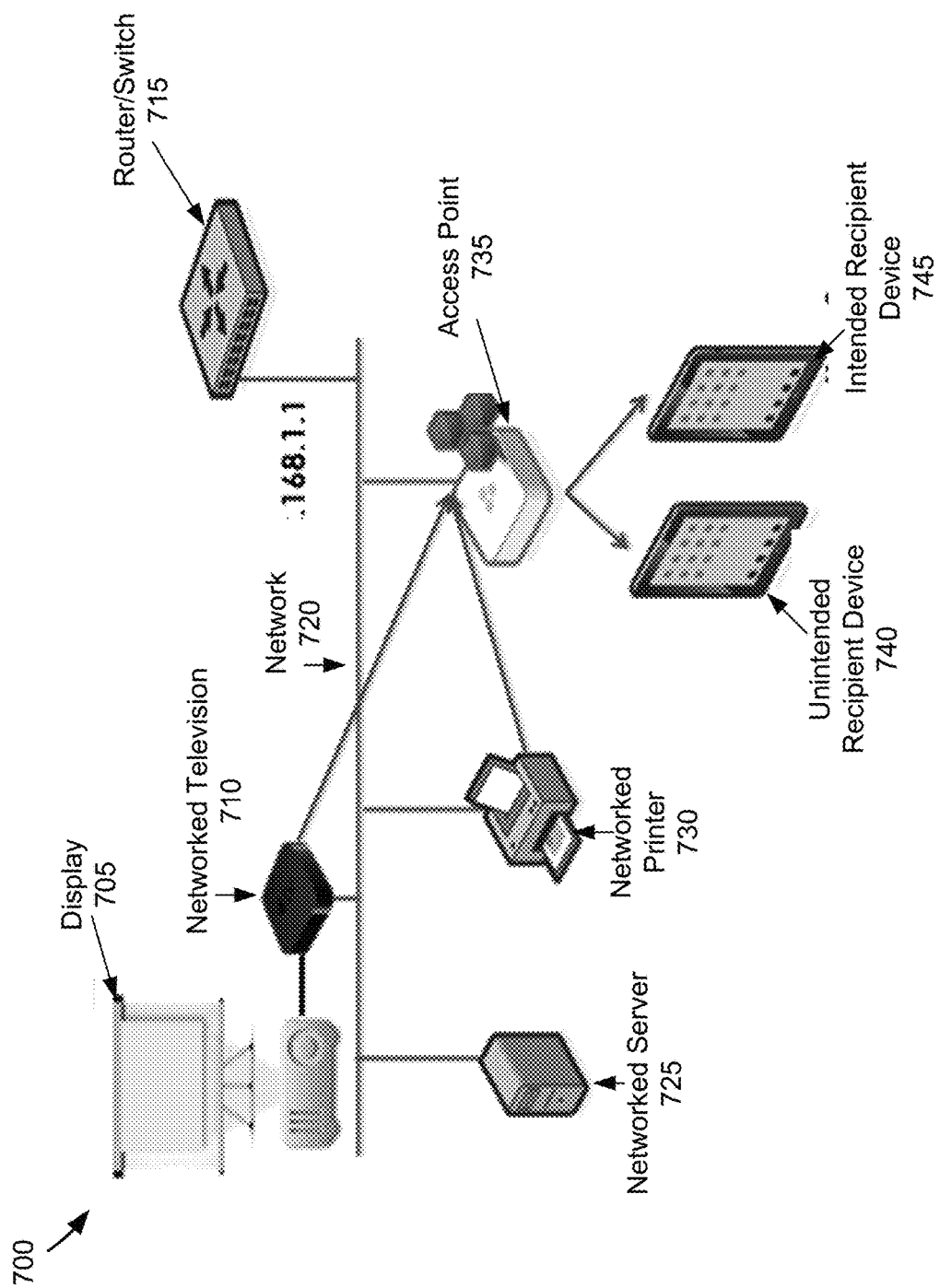
FIG. 7 shows an example of a network environment, according to some implementations.

FIG. 7 shows an example of a network environment 700, according to some implementations. In the example of FIG. 7, the network environment 700 includes a display 705, a networked television 710, a router/switch 715, a network 720, a networked server 725, a networked printer 730, an access point 735, an unintended recipient device 740, and an intended recipient device 745. As discussed herein, one or more of the elements of the network environment 700 may correspond to one or more of the elements of the network environment 100, shown in FIG. 1.

In the example of FIG. 7, the display 705 is coupled to the network 720. In an implementation, the display 705 can include any device that provides images or video to a user. The display 705 can comprise a Cathode Ray Tube (CRT), a plasma display, a Liquid Crystal Display (LCD), or a Light Emitting Diode (LED) display, in various embodiments. In an implementation, the display 705 displays content (e.g., images, video, web pages, documents) provided by the networked television 710. In an implementation, the display 705 can be coupled to a storage device that provides the display 705 with content. For example, the display 705 can be coupled to hard disk drives, magnetic media, optical disks (e.g., Compact Disk Read-Only Memory (CD-ROM), Digital Versatile Disks (DVDs)), or other media.

In the example of FIG. 7, the networked television 710 is coupled to the network 720 via the access point 735. In an implementation, the networked television 710 can include any device that receives content over the network 720 and provides the content to other devices coupled to the network 720. The networked television 710 may or may not be coupled to the display 705. In various implementations, the networked television 710 is linked to an Internet television service, such as Google® television, Apple® television, or Roku®. The networked television 710 can include hardware and/or software that implements protocols of the Internet television service.

In various implementations, the networked television 710 receives requests for content from one or more of the other devices coupled to the network 720 (e.g., the networked server 725, the networked printer 730, the unintended recipient device 740, or the intended recipient device 745). The networked television 710 can further satisfy the request with content from the Internet using the router/switch 715. In various implementations, the networked television 710 is configured to multicast the content to the other devices coupled to the network 720. More specifically, in various implementations, even in response to a request for content from one of the other devices coupled to the network 720, the networked television 710 can multicast the content to all of the other devices coupled to the network 720. The multicast can be in the form of a multicast data packet as discussed in this paper.

In the example of FIG. 7, the router/switch 715 is coupled to the network 720 through the access point 735. In an implementation, the router/switch 715 connects the network 720 to the Internet. In various implementations, the router/switch 715 can translate protocols used to communicate over the network 720 to protocols used to communicate over the Internet. In some implementations, the router/switch 715 can provide security for the network 720. More specifically, the router/switch 715 can protect portions of the network 720 from malicious incoming traffic, and can prevent malicious outgoing traffic from leaving the network 720. Though FIG. 7 shows the router/switch 715 as separate from the access point 735, it is noted that in various implementations, the functionalities of the router/switch 715 can be incorporated into the access point 735 or vice versa. Moreover, though the discussion herein discusses a multicast to unicast conversion engine (e.g., the multicast to unicast conversion engine 120 shown in FIG. 1) as residing within the access point 735, it is noted that in various implementations, a multicast to unicast conversion engine may reside within the router/switch 715.

In the example of FIG. 7, the network 720 is coupled, through the access point 735, to the networked television 710, the router/switch 715, the networked server 725, the networked printer 730, the unintended recipient device 740, and the intended recipient device 745. In various implementations, the network 720 may correspond to some or all of the portions of the network 110 shown in FIG. 1. As such, the network 720 may have some or all of elements of the network 110, discussed in the context of FIG. 1. In some implementations, the network 720 can comprise a trusted network having trusted resources, as discussed herein. The network 720 can also facilitate transfer of content between the networked television 710 and the other devices coupled to the network 720.

In the example of FIG. 7, the networked server 725 is coupled to the network 720 via the access point 735. In an implementation, the networked server 725 can provide services for the other devices coupled to the network 720. For instance, the networked server 725 can provide services for one or more of the networked television 710, the router/switch 715, the networked printer 730, the access point 735, the unintended recipient device 740, and the intended recipient device 745. In the example of FIG. 7, the networked printer 730 is coupled to the network 720. In a specific implementation, the networked printer 730 may print files, documents, content, etc. for the other devices coupled to the network 720.

In the example of FIG. 7, the access point 735 is coupled to the network 720 via the access point 735. In a specific implementation, the access point 735 can provide the unintended recipient device 740 and the intended recipient device 745 with access to the network 720. More specifically, the access point 735 can connect the unintended recipient device 740 and the intended recipient device 745 to one or more of the networked television 710, the router/switch 715, the networked server 724, the networked printer 730, and the Internet. In various embodiments, the access point 735 can correspond to the network access device 115, shown in FIG. 1.

In the example of FIG. 7, the unintended recipient device 740 is coupled to the network 720 via the access point 735. In various implementations, the unintended recipient device 740 can comprise any digital device, as described herein. In an implementation, the unintended recipient device 740 can receive data from devices, such as the networked television 710, the router/switch 715, the networked server 725, the networked printer 730, and the intended recipient device 745. In the example of FIG. 7, the intended recipient device 745 is coupled to the network 720 via the access point 735. In various implementations, the intended recipient device 745 can comprise any digital device, as described herein. In an implementation, the intended recipient device 745 can receive data from devices, such as the networked television 710, the router/switch 715, the networked server 725, the networked printer 730, and the unintended recipient device 740.

In a specific implementation, each of the devices coupled to the network 720 can maintain its own network address, such as a dynamic IP address, that provides a network location for the device. For instance, one or more of the networked television 710, the router/switch 715, the networked server 725, the networked printer 730, the access point 735, the unintended recipient device 740, and the intended recipient device 745 can maintain its own network address. It is noted forms of network addressing other than dynamic IP addressing can be possible in various implementations without departing from the scope and substance of the inventive concepts described herein.

In some implementations, one or more of the devices in the network environment 100 can send messages to other devices. The messages may take the form of multicasts to all the devices in the network environment 700. For instance, in an implementation, the networked television 710 can provide multicasts to the other devices in the network environment 100. An example of a multicast is a packet from one of the devices in the network environment 700 that is intended for all other devices in the network environment 700. Another example of a multicast is content of a particular television station (e.g., "Channel 5") that comes from the networked television 710 and is intended for the intended recipient device 745 but not intended for the other devices in the network environment 700. Yet another example of a multicast is resources from the networked server 725 that is intended for the intended recipient device 745 but not intended for the other devices in the network environment 700. The messages may also take the form of unicasts to one or more of the devices in the network environment 700.

It may be desirable to limit multicasts to intended devices. For example, the administrator of the network 720 may not want specific networked television content intended for only the intended recipient device 745 to go to devices other than the intended recipient device 745. Providing, for example, the unintended recipient device 740 with content intended for the intended recipient device 745 may unduly constrain the network 720 by unnecessarily providing multicasts to devices other than the intended recipient device 745. Providing such content to the unintended recipient device 740 may also interfere with the privacy and/or security of the intended recipient device 745 by allowing the unintended recipient device 740 to receive content that is intended for the intended recipient device 745.

For example, in some implementations, the networked television 710 can receive from the intended recipient device 745 a request for content, such as a request for a specific channel of television programming. In response to the request for content, the networked television 710 can obtain the requested content from the Internet, through the access point 735 and the router/switch 715. The networked television 710 can then multicast the requested content to all of the devices on the network environment 700. The networked television 710 can provide the multicast to the access point 735. In this implementation, the multicast to unicast conversion engine in the access point 735 can convert the multicast to a unicast that is directed to the intended recipient device 745. As a result, the requested content from the networked television 710 need not go to other devices on the network 720. More specifically, the requested content need not go to the networked printer 730 or the unintended recipient device 740. Rather, the requested content can be provided to the intended recipient device 745. Such a unicast can, in various implementations, save network resources and can improve the security and/or data privacy of the network 720. Though the discussion associated with the network environment 700 shows a multicast to unicast conversion for content to a single device (i.e., a unicast to the intended recipient device 745), it is noted various implementations may involve a multicast to unicast conversion for content to a single device associated with a particular user, content to a plurality of devices associated with a particular user, content to a user profile associated with a plurality of users and/or devices, content to a particular private pre-shared key (PPSK), or content to a particular VLAN.

Figure 8:
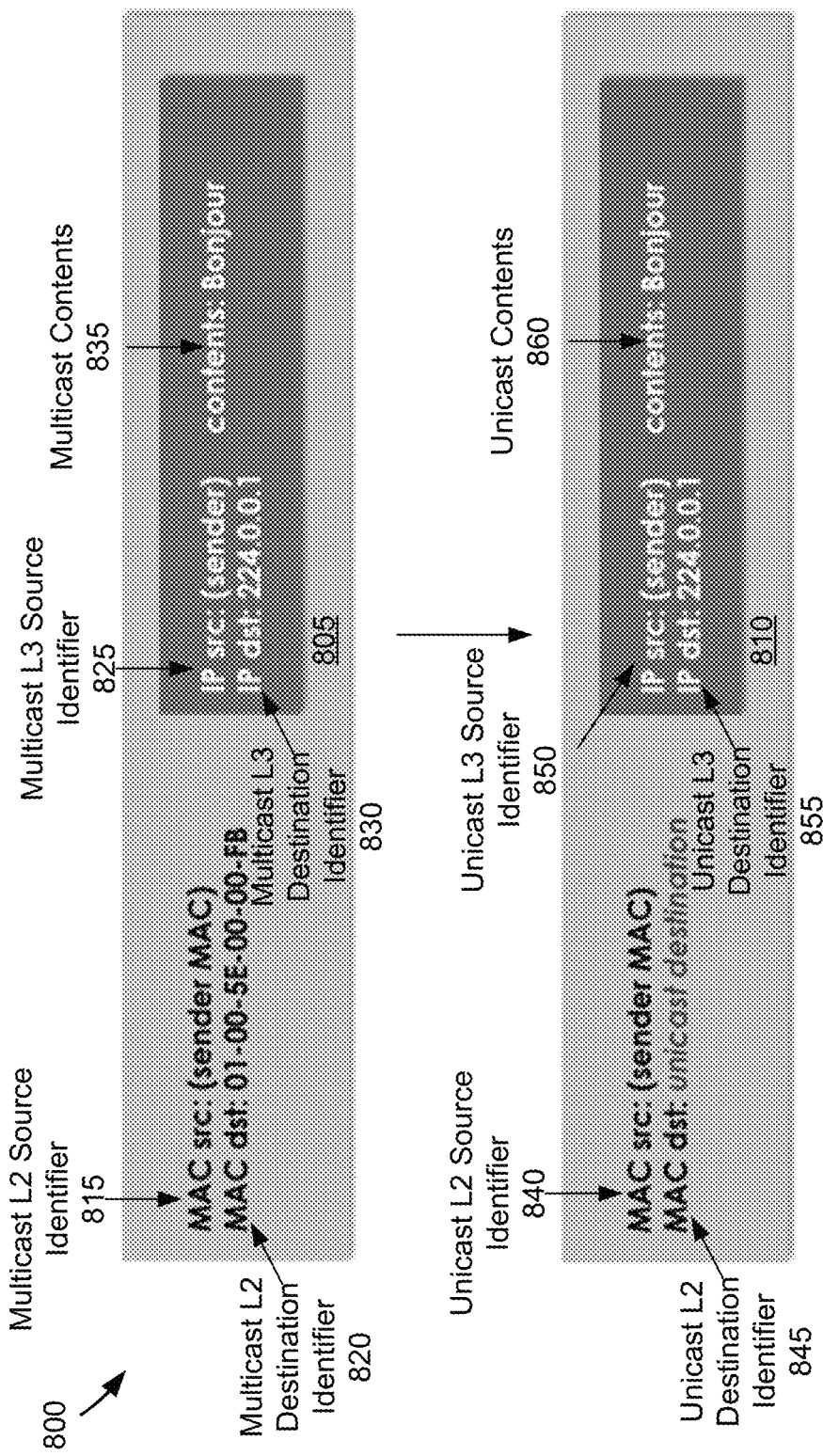
FIG. 8 shows an example of a screen of a conversion of a multicast frame into a series of unicast frames, according to some implementations.

FIG. 8 shows an example of a screen 800 of a conversion of a multicast frame into a series of unicast frames, according to some implementations. In the example of FIG. 8, the screen 800 includes a multicast frame 805 and a unicast frame 810.

In the example of FIG. 8, the multicast frame 805 includes a multicast L2 source identifier 815, a multicast L2 destination identifier 820, a multicast L3 source identifier 825, a multicast L3 destination identifier 830, and multicast contents 835. In an implementation, the multicast L2 source identifier 815 identifies a L2 network address (e.g., a MAC address) of a source of a multicast. The multicast L2 destination identifier 820 can identify a L2 network address (e.g., a MAC address) of a destination related to the multicast. In this example, the multicast L2 destination identifier 820 corresponds to the identifier of all of the devices that are to receive the multicast. In various implementations, the multicast L3 source identifier 825 can identify a L3 network address (e.g., an IP address) of a source of the multicast. The multicast L3 destination identifier 830 can identify a L3 network address (e.g., an IP address) of the destination related to the multicast. In some implementations, the multicast contents 835 can identify the contents of the multicast. In this example, the contents of the multicast can correspond to data from a Bonjour®-compatible router or wireless device.

In the example of FIG. 8, the unicast frame 810 includes a unicast L2 source identifier 840, a unicast L2 destination identifier 845, a unicast L3 source identifier 850, a unicast L3 destination identifier 855, and unicast contents 860.

In an implementation, the unicast L2 source identifier 840 identifies a L2 network address (e.g., a MAC address) of a source of a unicast. The unicast L2 destination identifier 845 can identify a L2 network address (e.g., a MAC address) of a destination related to the unicast. In this example, the unicast L2 destination identifier 845 corresponds to the MAC address of the devices that are to receive the unicast. In various implementations, the unicast L3 source identifier 850 can identify a L3 network address (e.g., an IP address) of a source of the unicast. The unicast L3 destination identifier 855 can identify a L3 network address (e.g., an IP address) of the destination related to the multicast. In some implementations, the unicast contents 860 can identify the contents of the unicast.

In an implementation, a multicast to unicast conversion engine (e.g., the multicast to unicast conversion engine 120 of FIG. 1) can convert the multicast frame 805 into the unicast frame 810 using the techniques described in this paper. More specifically, the multicast to unicast conversion engine can change the multicast L2 destination identifier 820 into the unicast L2 destination identifier 845. The other contents of the multicast frame 805 need not change. Such a conversion can facilitate numerous advantages, including maximizing network efficiency and network security.

Figure 9:
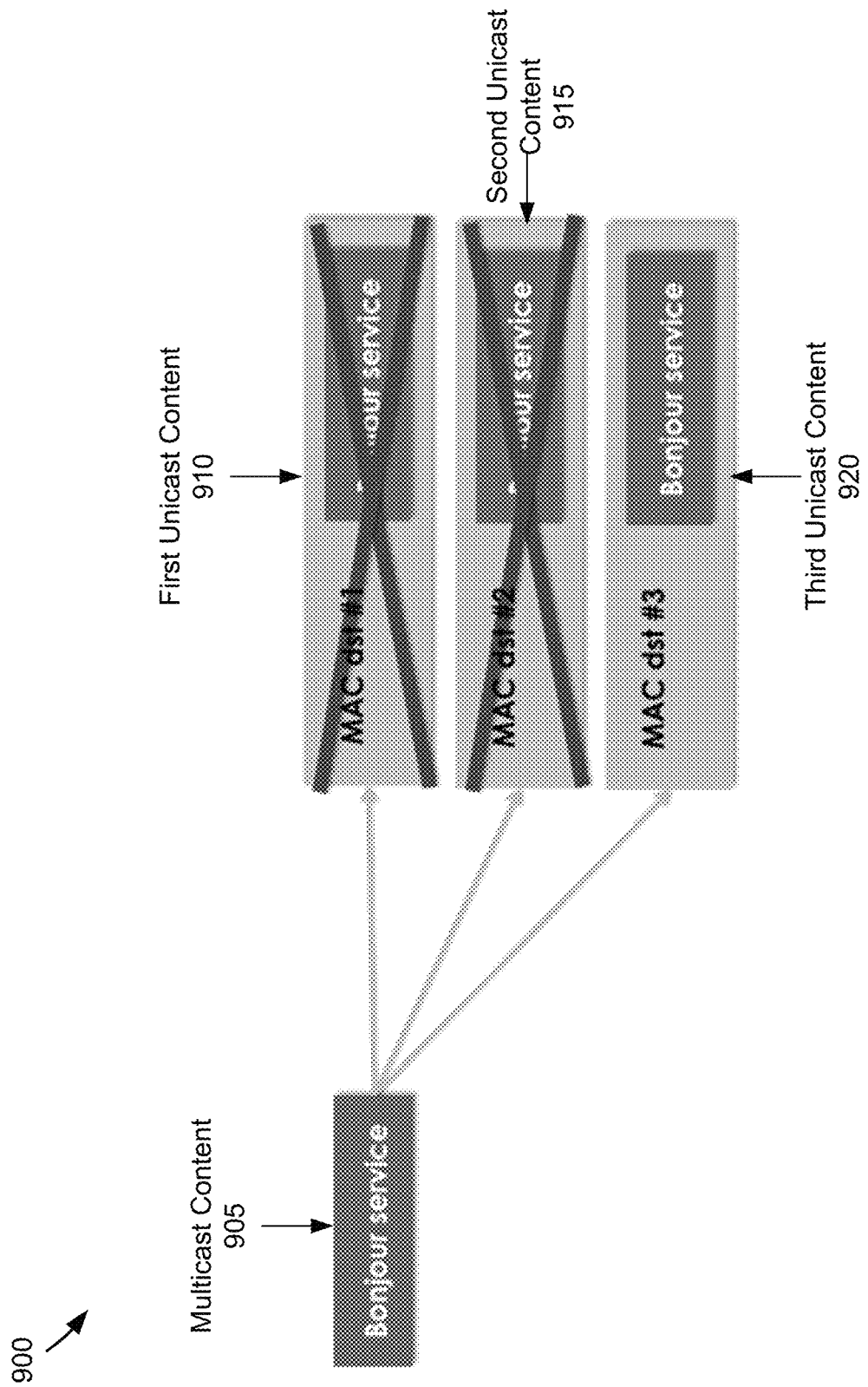
FIG. 9 shows an example of a screen of a conversion of a multicast frame into a unicast frame for a particular device, according to some implementations.

FIG. 9 shows an example of a screen 900 of a conversion of a multicast frame into a unicast frame for a particular device, according to some implementations. In the example of FIG. 9, the screen 900 includes multicast content 905, first unicast content 910, second unicast content 915, and third unicast content 920.

In a specific implementation, the multicast content 905 can include content formatted as a multicast. More specifically, the multicast content 905 can be directed to a plurality of devices in a network, such as the network 720 shown in FIG. 7. In a specific implementation, the multicast content 905 includes a multicast from a Bonjour®-compatible router or a Bonjour®-compatible device (e.g., the networked television 710 shown in FIG. 7). It is noted the multicast content 905 can also include other forms of content without departing from the scope and substance of the inventive concepts described herein.

In various implementations, each of the first unicast content 910, the second unicast content 915, and the third unicast content 920 can include content formatted as a unicast. That is, each of the first unicast content 910, the second unicast content 915, and the third unicast content 920 can include content directed to a single device in the network.

In a specific implementation, the multicast content 905 can correspond to a multicast from the networked television 710 (shown in FIG. 7). The first unicast content 910 and the second unicast content 915 can correspond to content directed to the unintended recipient device 740 (shown in FIG. 7) and/or other unintended recipient devices. The third unicast content 920 can correspond to content directed to the intended recipient device 745 (shown in FIG. 7). In various implementations, a multicast to unicast conversion engine (e.g., a multicast to unicast conversion engine in the access point 735) can convert the multicast content 905 into unicast content. The multicast to unicast conversion engine can also block the first unicast content 910 and the second unicast content 915 from accessing unintended recipient devices, while allowing the third unicast content 920 to access the intended recipient device 745.

Figure 10:
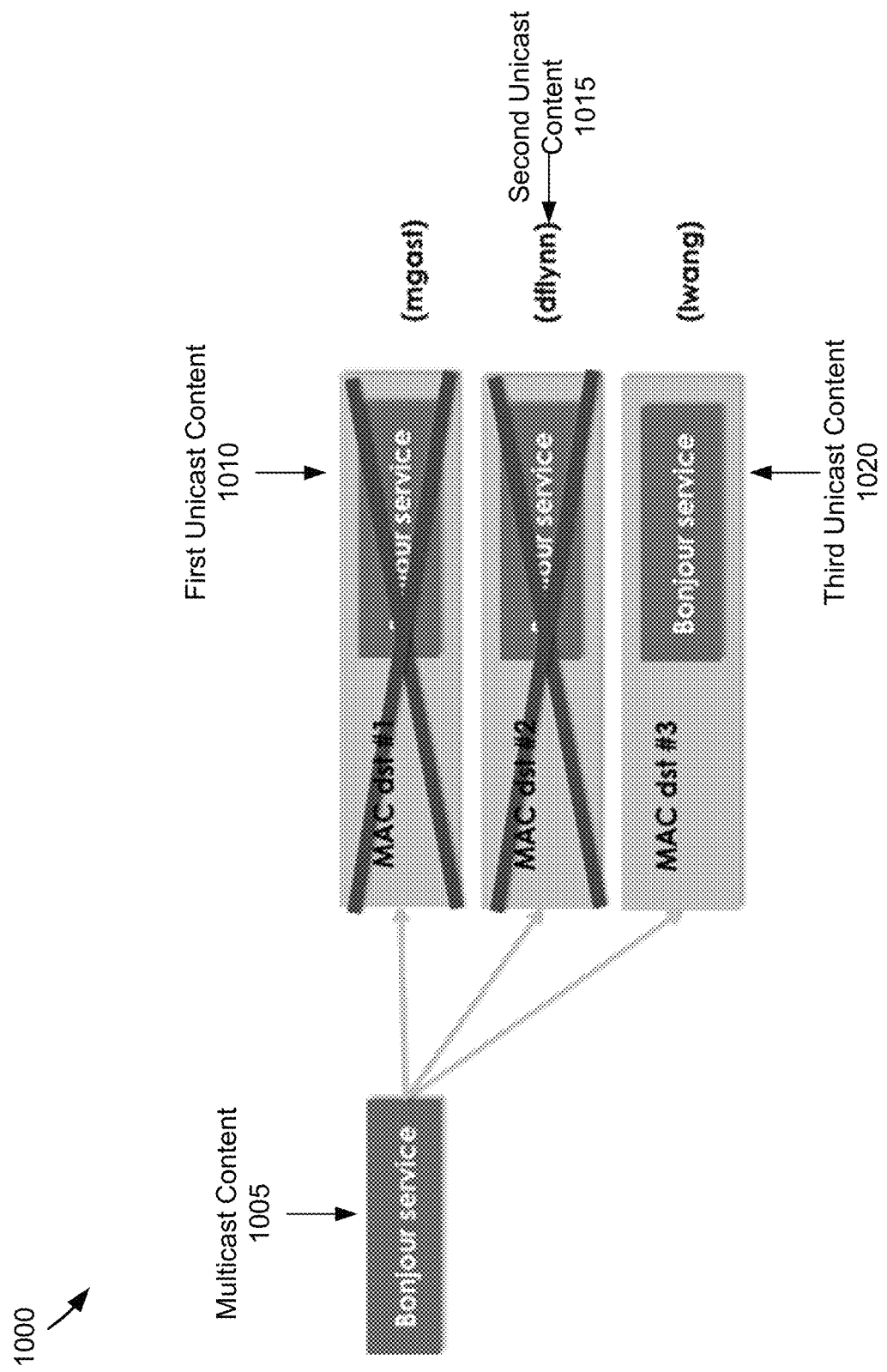
FIG. 10 shows an example of a screen of a conversion of a multicast frame into a unicast frame for a particular user, according to some implementations.

FIG. 10 shows an example of a screen 1000 of a conversion of a multicast frame into a unicast frame for a particular user, according to some implementations. In the example of FIG. 10, the screen 1000 includes multicast content 1005, first unicast content 1010, second unicast content 1015, and third unicast content 1020.

In a specific implementation, the multicast content 1005 can include content formatted as a multicast. More specifically, the multicast content 1005 can be directed to a plurality of devices on a network, such as the network 720, shown in FIG. 7. In a specific implementation, the multicast content 1005 includes a multicast from a Bonjour®-compatible router or a Bonjour®-compatible device (e.g., the networked television 710 shown in FIG. 7). It is noted the multicast content 1005 can also include other forms of content without departing from the scope and substance of the inventive concepts described herein.

In some implementations, each of the first unicast content 1010, the second unicast content 1015, and the third unicast content 1020 can include content formatted as a unicast. That is, each of the first unicast content 1010, the second unicast content 1015, and the third unicast content 1020 can include content directed to a single device in the network.

In a specific implementation, the multicast content 1005 can correspond to a multicast from the networked television 710 (shown in FIG. 7). The first unicast content 1010 can correspond to content directed to devices for a first user ("mgast") on a network (e.g., the network 720 shown in FIG. 7). The second unicast content 1015 can correspond to content directed to devices for a second user ("dflynn") on the network. The third unicast content 1020 can correspond to content directed to devices for a third user ("lwang") on the network. In various implementations, a multicast to unicast conversion engine (e.g., a multicast to unicast conversion engine in the access point 735) can convert the multicast content 1005 into unicast content. The multicast to unicast conversion engine can also block the first unicast content 1010 and the second unicast content 1015 from accessing unintended recipients and/or intended recipient devices, while allowing the third unicast content 1020 to access intended recipients and/or intended recipient devices.

Figure 11:
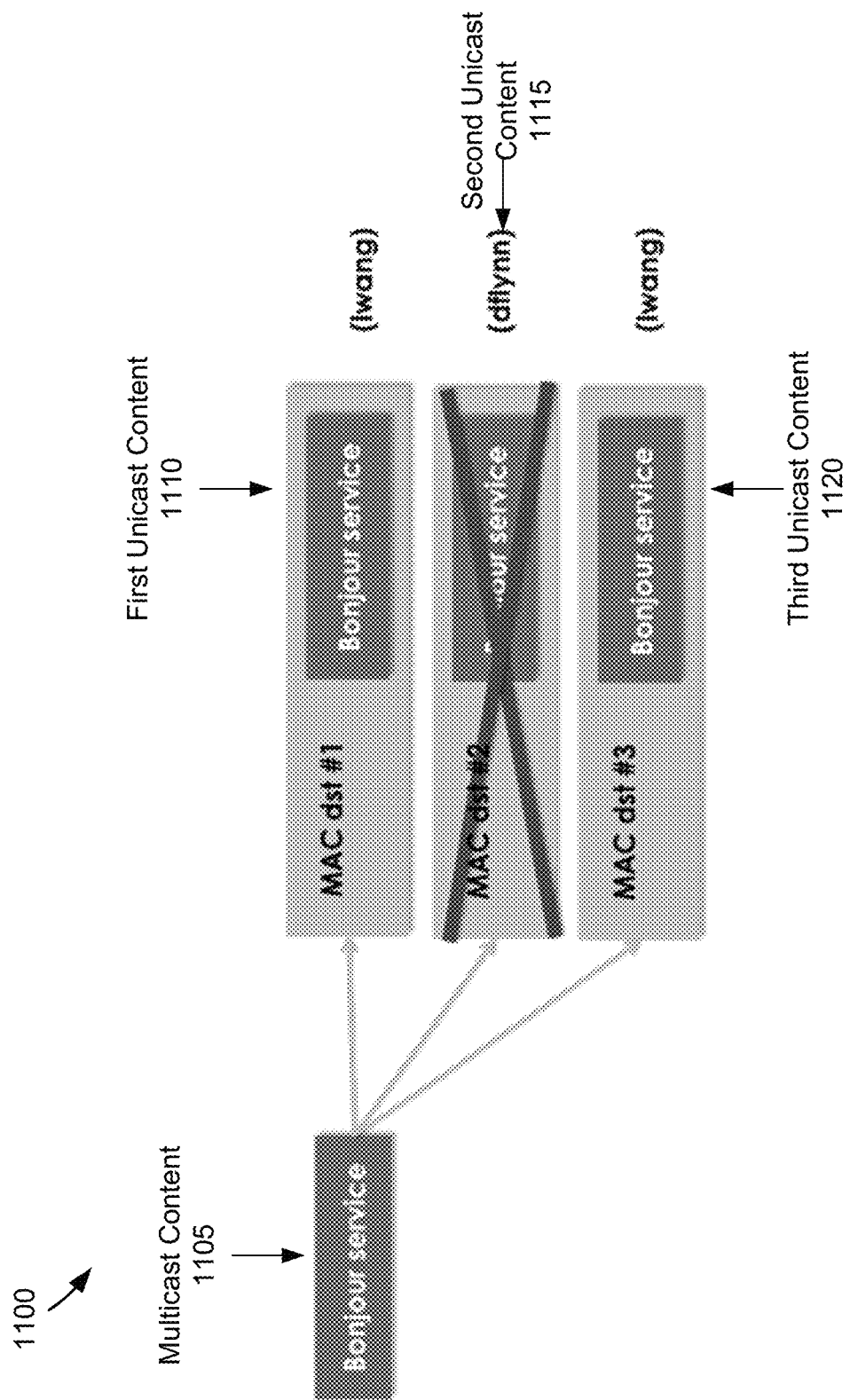
FIG. 11 shows an example of a screen of a conversion of a multicast frame into a unicast frame for a particular user associated with a plurality of devices, according to some implementations.

FIG. 11 shows an example of a screen 1100 of a conversion of a multicast frame into a unicast frame for a particular user associated with a plurality of devices, according to some implementations. In the example of FIG. 11, the screen 1100 includes multicast content 1105, first unicast content 1110, second unicast content 1115, and third unicast content 1120.

In a specific implementation, the multicast content 1105 can include content formatted as a multicast. More specifically, the multicast content 1105 can be directed to a plurality of devices on a network, such as the network 720, shown in FIG. 7. In a specific implementation, the multicast content 1105 includes a multicast from a Bonjour®-compatible router or a Bonjour®-compatible device (e.g., the networked television 710 shown in FIG. 7). It is noted the multicast content 1105 can also include other forms of content without departing from the scope and substance of the inventive concepts described herein.

In some implementations, each of the first unicast content 1110, the second unicast content 1115, and the third unicast content 1120 can include content formatted as a unicast. That is, each of the first unicast content 1110, the second unicast content 1115, and the third unicast content 1120 can include content directed to a single device in the network.

In a specific implementation, the multicast content 1105 can correspond to a multicast from the networked television 710 (shown in FIG. 7). The first unicast content 1110 can correspond to content directed to devices for a first user ("lwang") on a network (e.g., the network 720 shown in FIG. 7). The second unicast content 1115 can correspond to content directed to devices for a second user ("dflynn") on the network. The third unicast content 1120 can correspond to content directed to devices for the first user ("lwang") on the network. In various implementations, a multicast to unicast conversion engine (e.g., a multicast to unicast conversion engine in the access point 735) can convert the multicast content 1105 into unicast content. The multicast to unicast conversion engine can also block the second unicast content 1115, while allowing the first unicast content 1110 and the third unicast content 1120 to access intended recipients and/or intended recipient devices.

Figure 12:
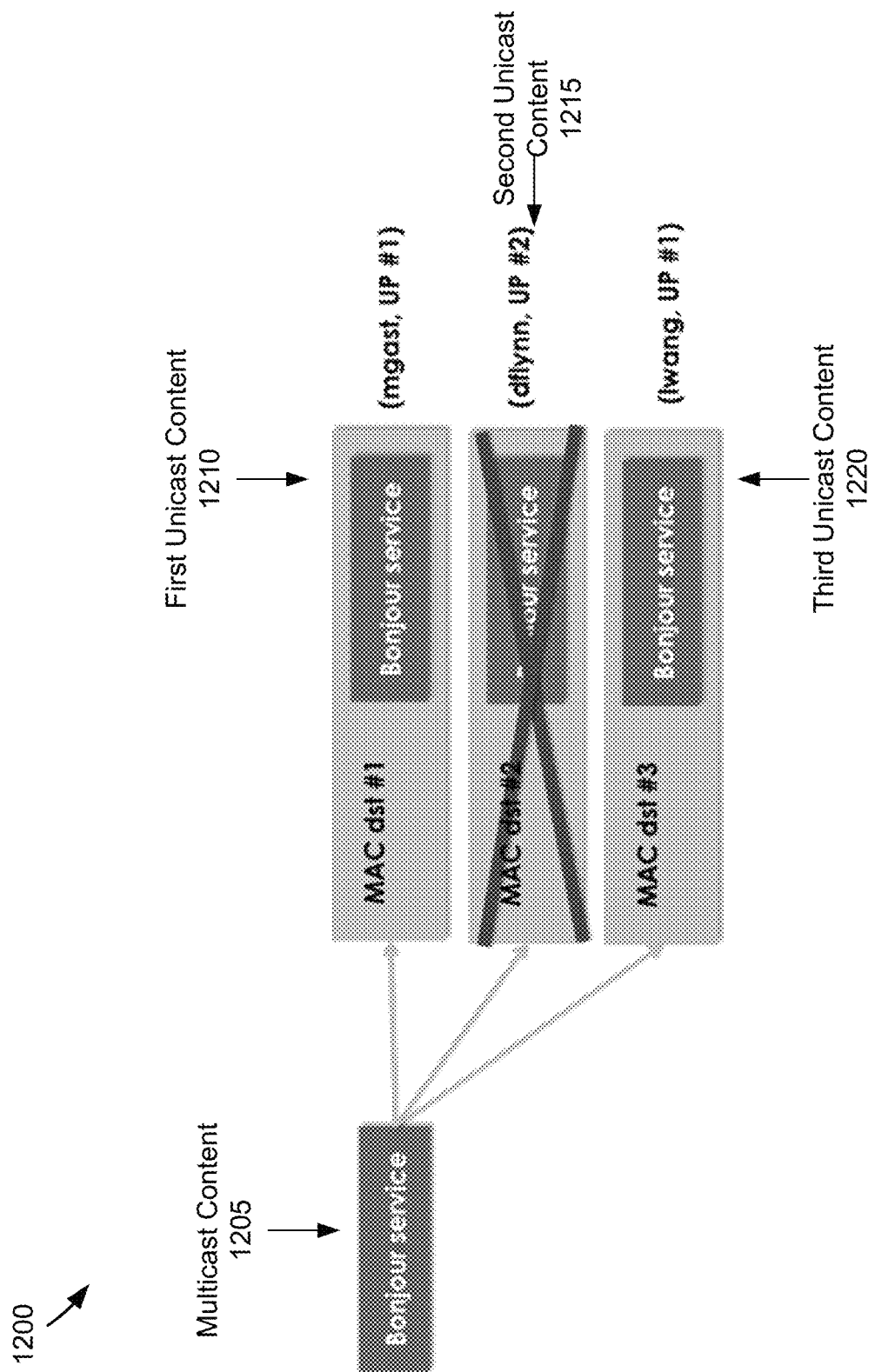
FIG. 12 shows an example of a screen of a conversion of a multicast frame into a unicast frame for a user profile associated with a plurality of users, according to some implementations.

FIG. 12 shows an example of a screen 1200 of a conversion of a multicast frame into a unicast frame for a user profile associated with a plurality of users, according to some implementations. In the example of FIG. 12, the screen 1200 includes multicast content 1205, first unicast content 1210, second unicast content 1215, and third unicast content 1220.

In a specific implementation, the multicast content 1205 can include content formatted as a multicast. More specifically, the multicast content 1205 can be directed to a plurality of devices on a network, such as the network 720, shown in FIG. 7. In a specific implementation, the multicast content 1205 includes a multicast from a Bonjour®-compatible router or a Bonjour®-compatible device (e.g., the networked television 710 shown in FIG. 7). It is noted the multicast content 1205 can also include other forms of content without departing from the scope and substance of the inventive concepts described herein.

In some implementations, each of the first unicast content 1210, the second unicast content 1215, and the third unicast content 1220 can include content formatted as a unicast. That is, each of the first unicast content 1210, the second unicast content 1215, and the third unicast content 1220 can include content directed to a single device in the network.

In a specific implementation, the multicast content 1205 can correspond to a multicast from the networked television 710 (shown in FIG. 7). The first unicast content 1210 can correspond to content directed to devices for a first user profile ("UP #1") on a network (e.g., the network 720 shown in FIG. 7). The second unicast content 1215 can correspond to content directed to devices for a second user profile ("UP #2") on the network. The third unicast content 1220 can correspond to content directed to devices for a first profile ("UP #1"). In various implementations, a multicast to unicast conversion engine (e.g., a multicast to unicast conversion engine in the access point 735) can convert the multicast content 1205 into unicast content. The multicast to unicast conversion engine can also block the second unicast content 1215, while allowing the first unicast content 1210 and the third unicast content 1220 to access intended recipients and/or intended recipient devices.

Figure 13:
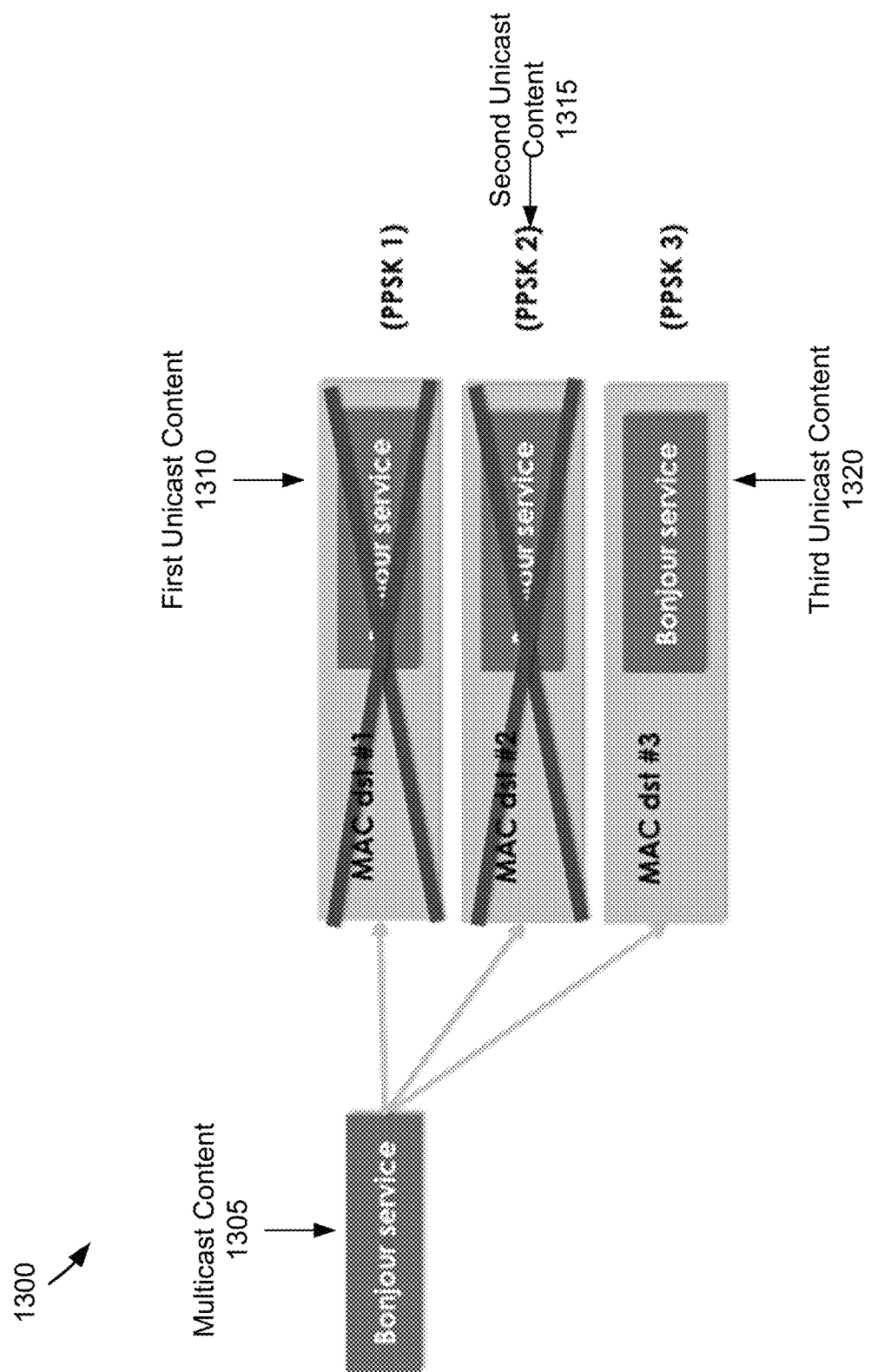
FIG. 13 shows an example of a screen of a conversion of a multicast frame into a unicast frame for a particular private pre-shared key (PPSK), according to some implementations.

FIG. 13 shows an example of a screen 1300 of a conversion of a multicast frame into a unicast frame for a particular private pre-shared key (PPSK), according to some implementations. In the example of FIG. 13, the screen 1300 includes multicast content 1305, first unicast content 1310, second unicast content 1315, and third unicast content 1320.

In a specific implementation, the multicast content 1305 can include content formatted as a multicast. More specifically, the multicast content 1305 can be directed to a plurality of devices on a network, such as the network 720, shown in FIG. 7. In a specific implementation, the multicast content 1305 includes a multicast from a Bonjour®-compatible router or a Bonjour®-compatible device (e.g., the networked television 710 shown in FIG. 7). It is noted the multicast content 1305 can also include other forms of content without departing from the scope and substance of the inventive concepts described herein.

In some implementations, each of the first unicast content 1310, the second unicast content 1315, and the third unicast content 1320 can include content formatted as a unicast. That is, each of the first unicast content 1310, the second unicast content 1315, and the third unicast content 1320 can include content directed to a single device in the network.

In a specific implementation, the multicast content 1305 can correspond to a multicast from the networked television 710 (shown in FIG. 7). The first unicast content 1310 can correspond to content directed to devices for a first PPSK ("PPSK 1") on a network (e.g., the network 720 shown in FIG. 7). The second unicast content 1315 can correspond to content directed to devices for a second PPSK ("PPSK 2") on the network. The third unicast content 1320 can correspond to content directed to devices for a third PPSK ("PPSK 3") on the network. In various implementations, a multicast to unicast conversion engine (e.g., a multicast to unicast conversion engine in the access point 735) can convert the multicast content 1305 into unicast content. The multicast to unicast conversion engine can also block the first unicast content 1310 and the second unicast content 1315, while allowing the third unicast content 1320 to access intended recipients and/or intended recipient devices.

Figure 14:
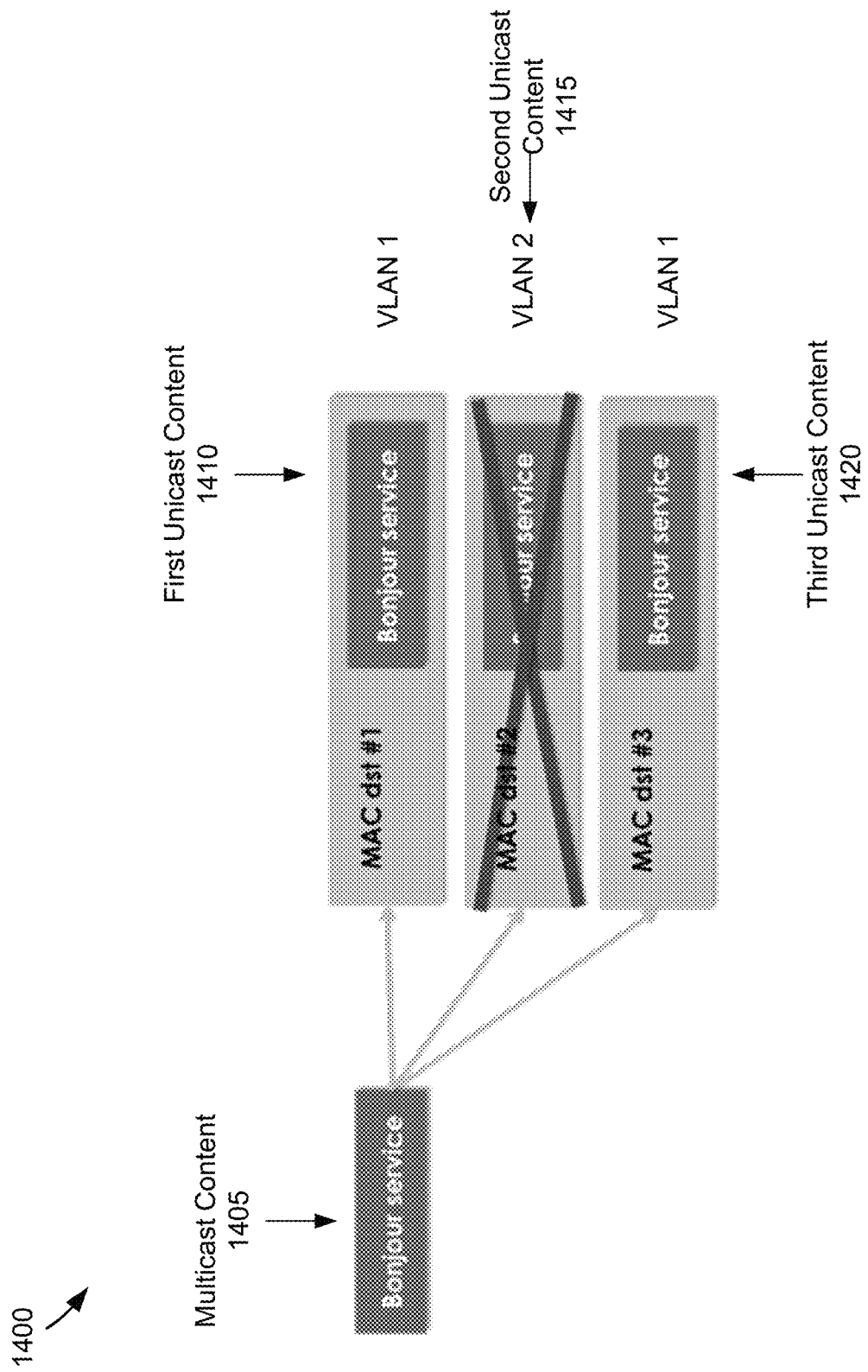
FIG. 14 shows an example of a screen of a conversion of a multicast frame into a unicast frame for a particular virtual local area network (VLAN), according to some implementations.

FIG. 14 shows an example of a screen of a conversion of a multicast frame into a unicast frame for a particular virtual local area network (VLAN), according to some implementations. In the example of FIG. 14, the screen 1400 includes multicast content 1405, first unicast content 1410, second unicast content 1415, and third unicast content 1420.

In a specific implementation, the multicast content 1405 can include content formatted as a multicast. More specifically, the multicast content 1405 can be directed to a plurality of devices on a network, such as the network 720, shown in FIG. 7. In a specific implementation, the multicast content 1405 includes a multicast from a Bonjour®-compatible router or a Bonjour®-compatible device (e.g., the networked television 710 shown in FIG. 7). It is noted the multicast content 1405 can also include other forms of content without departing from the scope and substance of the inventive concepts described herein.

In some implementations, each of the first unicast content 1410, the second unicast content 1415, and the third unicast content 1420 can include content formatted as a unicast. That is, each of the first unicast content 1410, the second unicast content 1415, and the third unicast content 1420 can include content directed to a single device in the network.

In a specific implementation, the multicast content 1405 can correspond to a multicast from a networked television 710 (shown in FIG. 7). The first unicast content 1410 can correspond to content directed to devices on a first VLAN ("VLAN 1"), on a network (e.g., the network 720 shown in FIG. 7). The second unicast content 1415 can correspond to content directed to devices on a second VLAN ("VLAN 2") on the network. The third unicast content 1420 can correspond to content directed to devices on the first VLAN ("VLAN 1"). In various implementations, a multicast to unicast conversion engine (e.g., a multicast to unicast conversion engine in the access point 735) can convert the multicast content 1405 into unicast content. The multicast to unicast conversion engine can also block the second unicast content 1415, while allowing the first unicast content 1410 and the third unicast content 1420 to access intended recipients and/or intended recipient devices.

Figure 15:
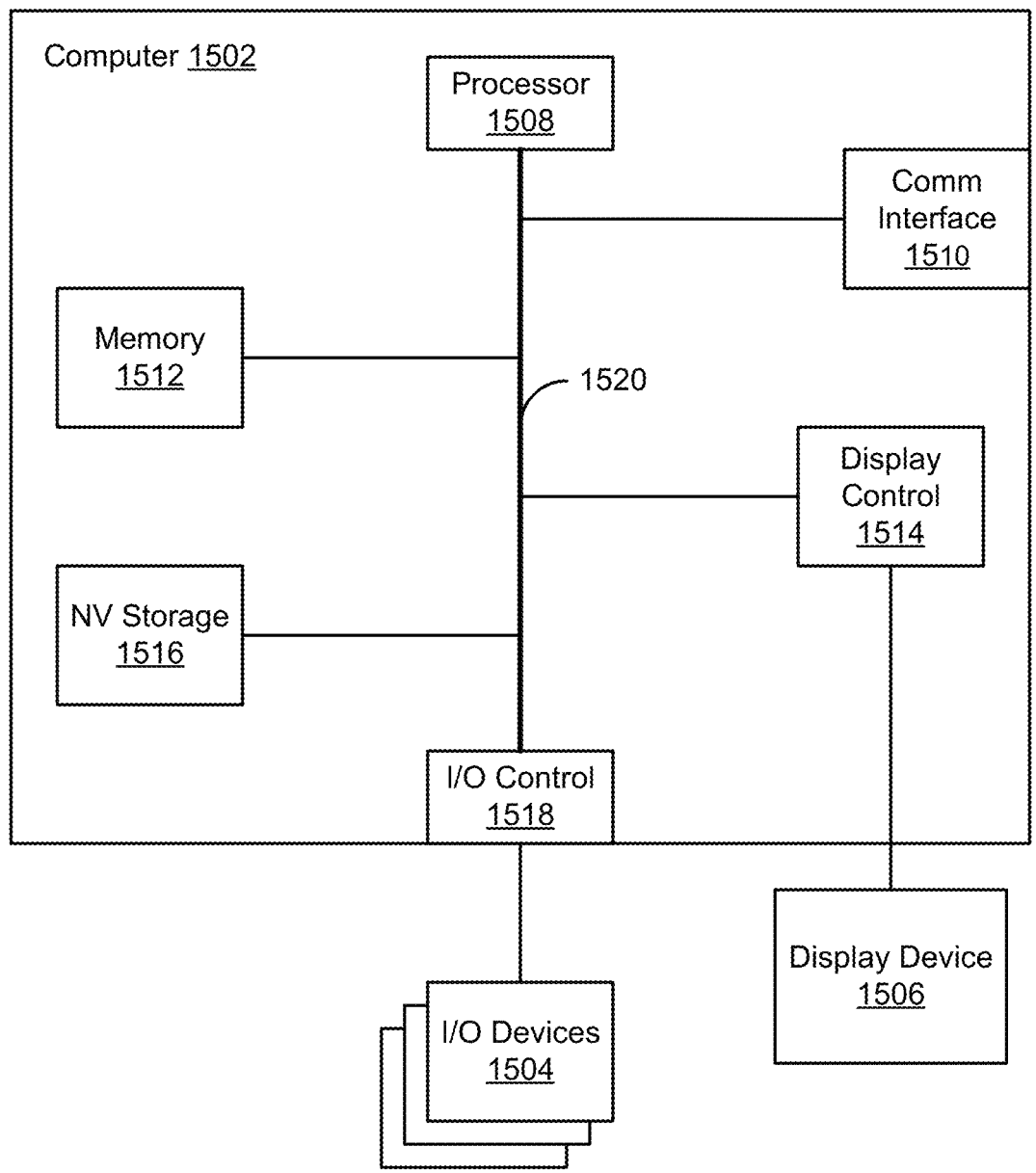
FIG. 15 shows an example of a digital device, according to some embodiments.

FIG. 15 shows an example of a digital device 1500. In the example of FIG. 15, the digital device 1500 can be a conventional computer system that can be used as a client computer system, such as a wireless client or a workstation, or a server computer system. In an implementation, the digital device 1500 includes a computer 1502, I/O devices 1504, and a display device 1506. The computer 1502 can include a processor 1508, a communications interface 1510, memory 1512, a display controller 1514, non-volatile storage 1516, and an I/O controller 1518. In some implementations, the computer 1502 is coupled to or includes the I/O devices 1504 and/or the display device 1506.

In an implementation, the computer 1502 interfaces to external systems through the communications interface 1510, which can include a modem or network interface. It will be appreciated that the communications interface 1510 can be considered to be part of the digital device 1500 or a part of the computer 1502. The communications interface 1510 can be an analog modem, ISDN modem, cable modem, token ring interface, satellite transmission interface (e.g. "direct PC"), or other interfaces for coupling a computer system to other computer systems, in various implementations.

In various implementations, the processor 1508 can include any processor. In some implementations the processor 1508 can include a microprocessor, such as an Intel Pentium® microprocessor or Motorola® power PC microprocessor. The memory 1512 can be coupled to the processor 1508 by a bus 1520. The memory 1512 can be Dynamic Random Access Memory (DRAM) and can also include Static RAM (SRAM). The bus 1520 can couple the processor 1508 to the memory 1512, also to the non-volatile storage 1516, to the display controller 1514, and/or to the I/O controller 1518.

In some implementations, the I/O devices 1504 can include any devices used to provide input to the digital device 1500 or to facilitate outputs from the digital device 1500. In various implementations, the I/O device 1505 can include one or more of: a keyboard, disk drives, printers, a scanner, and other input and output devices, including a mouse or other pointing device. The display controller 1514 can control a display on the display device 1506, which can be, for example, a cathode ray tube (CRT) or liquid crystal display (LCD). The display controller 1514 and the I/O controller 1518 can be implemented with conventional well known technology.

In a specific implementation, the non-volatile storage 1516 can include any form of non-volatile storage. In some implementations, the non-volatile storage 1516 can include one or more of: magnetic hard disk, an optical disk, or another form of storage for large amounts of data. Some of this data is often written, by a direct memory access process, into memory 1512 during execution of software in the computer 1502. It is noted that the terms "machine-readable medium" or "computer-readable medium," as used in this paper, can include any type of storage device that is accessible by the processor 1508 and also encompasses a carrier wave that encodes a data signal.

In the example of FIG. 15, the digital device 1500 is one example of many possible computer systems which have different architectures. For example, personal computers based on an Intel® processor and/or microprocessor can have multiple buses, one of which can be an I/O bus for the peripherals and one that directly connects the processor 1508 and the memory 1512 (often referred to as a memory bus). The buses are connected together through bridge components that perform any necessary translation due to differing bus protocols.

Network computers are another type of computer system that can be used in conjunction with the teachings provided herein. Network computers do not usually include a hard disk or other mass storage, and the executable programs are loaded from a network connection into the memory 312 for execution by the processor 308. A Web TV system, which is known in the art, is also considered to be a computer system, but it can lack some of the features shown in FIG. 3, such as certain input or output devices. A typical computer system will usually include at least a processor, memory, and a bus coupling the memory to the processor.

Figure 16:
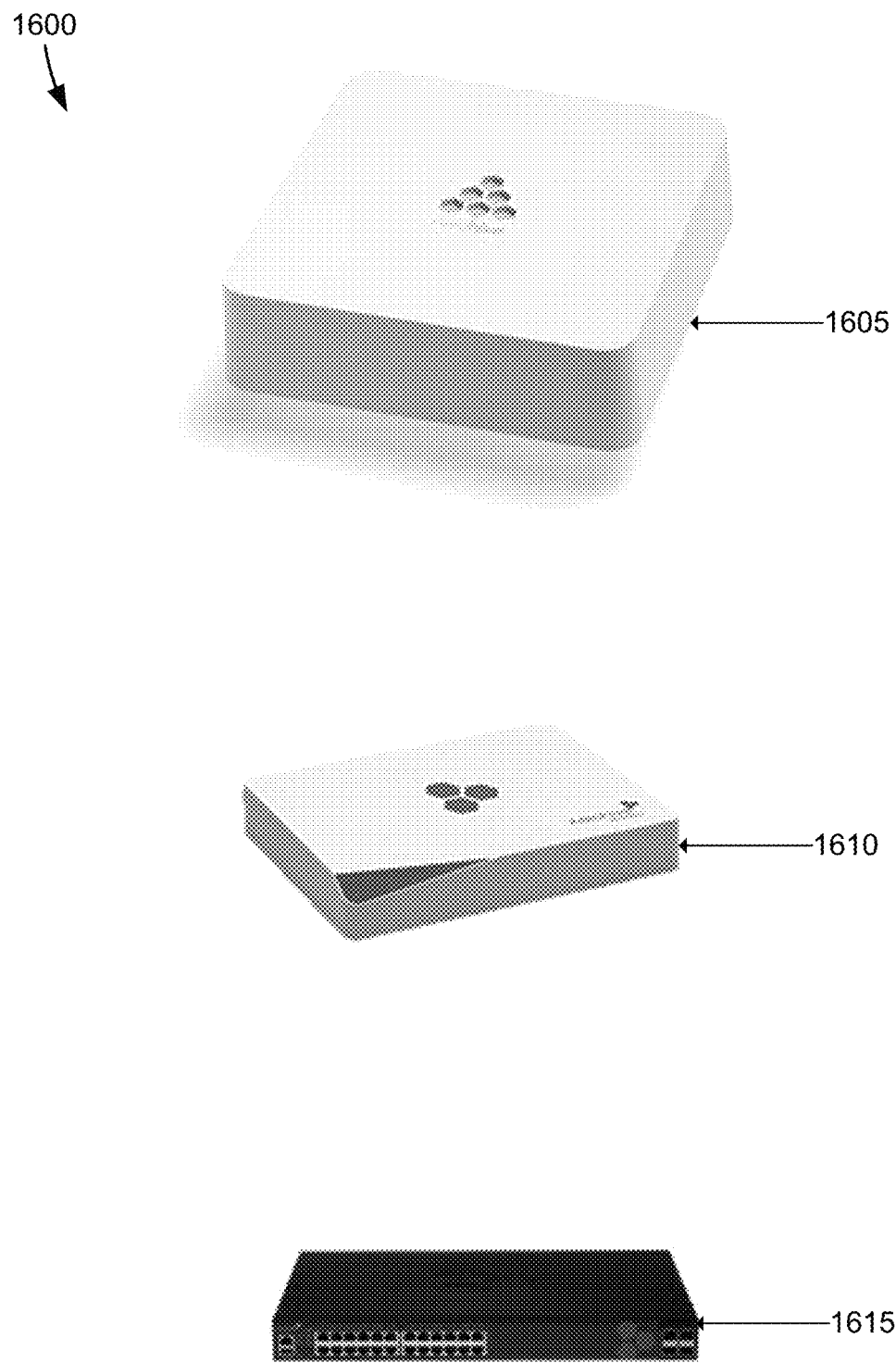
FIG. 16 shows examples of a plurality of network access devices, according to some embodiments.

FIG. 16 shows examples of a plurality of network access devices 1600, according to some embodiments. In the example of FIG. 16, the network access devices 1600 can include an access point 1605, a router 1610, and a switch 1615. One or more of the access point 1605, the router 1610, and the switch 1615 can contain at least portions of the systems and modules described herein. More specifically, in various implementations, one or more of the access point 1605, the router 1610, and the switch 1615 may correspond to the network access device 115, shown in FIG. 1. In some implementations, one or more of the access point 1605, the router 1610, and the switch 1615 can include the multicast to unicast conversion engine 120, shown in FIG. 1 and described in greater detail herein.

This paper describes techniques that those of skill in the art can implement in numerous ways. For instance, those of skill in the art can implement the techniques described in this paper using a process, an apparatus, a system, a composition of matter, a computer program product embodied on a computer-readable storage medium, and/or a processor, such as a processor configured to execute instructions stored on and/or provided by a memory coupled to the processor.

Unless stated otherwise, a component such as a processor or a memory described as being configured to perform a task may be implemented as a general component that is configured to perform the task at a given time or a specific component that is manufactured to perform the task. As used in this paper, the term 'processor' refers to one or more devices, circuits, and/or processing cores configured to process data, such as computer program instructions.

A detailed description of one or more implementations of the invention is provided in this paper along with accompanying figures that illustrate the principles of the invention. The invention is described in connection with such implementations, but the invention is not limited to any implementation. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Techniques described in this paper relate to apparatus for performing the operations. The apparatus can be specially constructed for the required purposes, or it can comprise a general purpose computer selectively activated or reconfigured by a computer program stored in the computer. Such a computer program may be stored in a computer-readable storage medium, such as, but is not limited to, read-only memories (ROMs), random access memories (RAMs), EPROMs, EEPROMs, magnetic or optical cards, any type of disk including floppy disks, optical disks, CD-ROMs, and magnetic-optical disks, or any type of media suitable for storing electronic instructions, and each coupled to a computer system bus.

As disclosed in this paper, implementations allow editors to create professional productions using themes and based on a wide variety of amateur and professional content gathered from numerous sources. Although the foregoing implementations have been described in some detail for purposes of clarity of understanding, implementations are not necessarily limited to the details provided.

The invention claimed is:

1. A system, comprising:
   a memory; and
   one or more processors coupled to the memory and configured to:
      extract network address information from a multicast frame directed to a multicast group of a plurality of multicast groups,
      based on the extracted network address information, determine an intended recipient device of content of the multicast frame and an unintended recipient device of the content of the multicast frame, wherein the intended recipient device and the unintended recipient device are members of the multicast group of the plurality of multicast groups,
      identify a unicast address of the intended recipient device, and
      transmit the content of the multicast frame as a unicast frame to the intended recipient device using the unicast address of the intended recipient device.

2. The system of claim 1, wherein the network address information comprises layer-2 information or layer-3 information, and wherein the layer-2 information or the layer-3 information is extracted from a header of the multicast frame.

3. The system of claim 1, wherein the network address information comprises at least one destination media access control (MAC) address, or at least one transmission control protocol/internee protocol (TCP/IP) address, wherein the at least one MAC address or the at least one TCP/IP address is extracted from a header of the multicast frame.

4. The system of claim 1, the one or more processors further configured to:
   identify a unicast address of the unintended recipient device; and
   block transmission of the content of the multicast frame using the multicast frame or a unicast frame addressed to the unintended recipient device.

5. The system of claim 1, the one or more processors further configured to:
   cache the unicast frame that comprises the content for delivery to the intended recipient device.

6. The system of claim 1, wherein the intended recipient device comprises a plurality of devices associated with a particular virtual local area network (VLAN).

7. The system of claim 1, wherein the intended recipient device comprises a plurality of devices associated with a particular network private pre-shred key (PPSK).

8. A method, comprising:
   extracting network address information from a multicast frame directed to a multicast group of a plurality of multicast groups;
   based on the extracted network address information, determining an intended recipient device of content of the multicast frame and an unintended recipient device of the content of the multicast frame, wherein the intended recipient device and the unintended recipient device are members of the multicast group of the plurality of multicast groups;

identifying a unicast address of the intended recipient device; and transmitting the content of the multicast frame as a unicast frame to the intended recipient device using the unicast address of the intended recipient device.

9. The method of claim 8, wherein the network address information comprises layer-2 information or layer-3 information, and wherein the layer-2 information or the layer-3 information is extracted from a header of the multicast frame.

10. The method of claim 8, wherein the network address information comprises at least one destination media access control (MAC) address or at least one transmission control protocol/internet protocol (TCP/IP) address, wherein the at least one MAC address or the at least one TCP/IP address is extracted from a header of the multicast frame.

11. The method of claim 8, further comprising:

identifying a unicast address of the unintended recipient device; and blocking transmission of the content of the multicast frame using the multicast frame or a unicast frame addressed to the unintended recipient device.

12. The method of claim 8, further comprising:

caching the unicast frame that comprises the content for delivery to the intended recipient device.

13. The method of claim 8, wherein the intended recipient device comprises a plurality of devices associated with a particular virtual local area network (VLAN).

14. The method of claim 8, wherein the intended recipient device comprises a plurality of devices associated with a particular network private pre-shred key (PPSK).

15. A non-transitory computer-readable medium having stored thereon software instructions that, when executed by one or more processors, cause the one or more processors to perform operations comprising:

extracting network address information from a multicast frame directed to a multicast group of a plurality of multicast groups;

based on the extracted network address information;

determining an intended recipient device of content of the multicast frame and an unintended recipient device of the content of the multicast frame, wherein the intended recipient device and the unintended recipient device are members of the multicast group of the plurality of multicast groups;

identifying a unicast address of the intended recipient device; and transmitting the content of the multicast frame as a unicast frame to the intended recipient device using the unicast address of the intended recipient device.

16. The non-transitory computer-readable medium of claim 15, wherein the network address information comprises layer-2 information and layer-3 information, and wherein the layer-2 information and the layer-3 information are extracted from a header of the multicast frame.

17. The non-transitory computer-readable medium of claim 15, wherein the network address information comprises at least one destination media access control (MAC) address and at least one transmission control protocol/internet protocol (TCP/IP) address, wherein the at least one MAC address and the at least one TCP/IP address are extracted from a header of the multicast frame.

18. The non-transitory computer-readable medium of claim 15, wherein the operations further comprise:

identifying a unicast address of the unintended recipient device; and blocking transmission of the content of the multicast frame using the multicast frame or a unicast frame addressed to the unintended recipient device.

19. The non-transitory computer-readable medium of claim 15, wherein the operations further comprise:

caching the unicast frame that comprises the content for delivery to the intended recipient device.

20. The non-transitory computer-readable medium of claim 15, wherein the intended recipient device comprises a plurality of devices associated with a particular virtual local area network (VLAN) and/or a particular network private pre-shred key (PPSK).

* * * * *